United States Patent
Matsukawa

(10) Patent No.: US 11,871,231 B2
(45) Date of Patent: Jan. 9, 2024

(54) APPARATUS MANAGEMENT SYSTEM, MANAGEMENT TARGET APPARATUS, AND MANAGEMENT METHOD

(71) Applicant: Yoshihisa Matsukawa, Chiba (JP)

(72) Inventor: Yoshihisa Matsukawa, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 100 days.

(21) Appl. No.: 17/522,906

(22) Filed: Nov. 10, 2021

(65) Prior Publication Data
US 2022/0167168 A1    May 26, 2022

(30) Foreign Application Priority Data
Nov. 25, 2020    (JP) ................. 2020-195288

(51) Int. Cl.
*H04W 12/104* (2021.01)
*H04W 12/40* (2021.01)
(Continued)

(52) U.S. Cl.
CPC ......... *H04W 12/104* (2021.01); *H04W 12/06* (2013.01); *H04W 12/40* (2021.01); *H04W 12/63* (2021.01)

(58) Field of Classification Search
CPC ....... H04W 4/70; H04W 12/06; H04W 84/18; H04W 76/10; H04W 24/02; H04W 4/08; H04W 88/16; H04W 4/12; H04W 8/08; H04W 88/02; H04W 4/33; H04W 12/50; H04W 40/246; H04W 8/24; H04W 60/04;
(Continued)

(56) References Cited

U.S. PATENT DOCUMENTS

2013/0335772 A1*  12/2013  Waller ............... H04N 1/00477
                                                358/1.15
2019/0034140 A1*   1/2019  Yamada ................ G06F 3/1259

FOREIGN PATENT DOCUMENTS

| JP | 2018-120537 | 8/2018 |
| JP | 2018-157455 | 10/2018 |
| JP | 2019-160274 | 9/2019 |

* cited by examiner

*Primary Examiner* — Kwasi Karikari
(74) *Attorney, Agent, or Firm* — XSENSUS LLP

(57) ABSTRACT

An apparatus management system, a management target apparatus, and a management method. The apparatus management system includes a plurality of management target apparatuses each configured to provide apparatus information of own apparatus and a communication terminal configured to receive apparatus status information included in the apparatus information received from each of the plurality of management target apparatuses, the apparatus status information indicating status of the management target apparatus, using a predetermined communication protocol. Each of the plurality of the management target apparatuses receives process information indicating a predetermined process for each of the plurality of management target apparatuses, created based on the apparatus status information transmitted from the communication terminal through a mediating apparatus that mediates between the plurality of management target apparatuses and the communication terminal, and executes the predetermined process indicated by the process information when the process information includes own apparatus identification information.

15 Claims, 18 Drawing Sheets

(51) Int. Cl.
*H04W 12/06* (2021.01)
*H04W 12/63* (2021.01)

(58) Field of Classification Search
CPC ... H04W 52/265; H04W 52/281; H04W 4/24; H04W 76/25; H04W 80/06; H04W 12/77; H04W 36/36; H04W 88/14; H04W 36/125; H04W 12/043; H04W 12/30; H04W 28/16

See application file for complete search history.

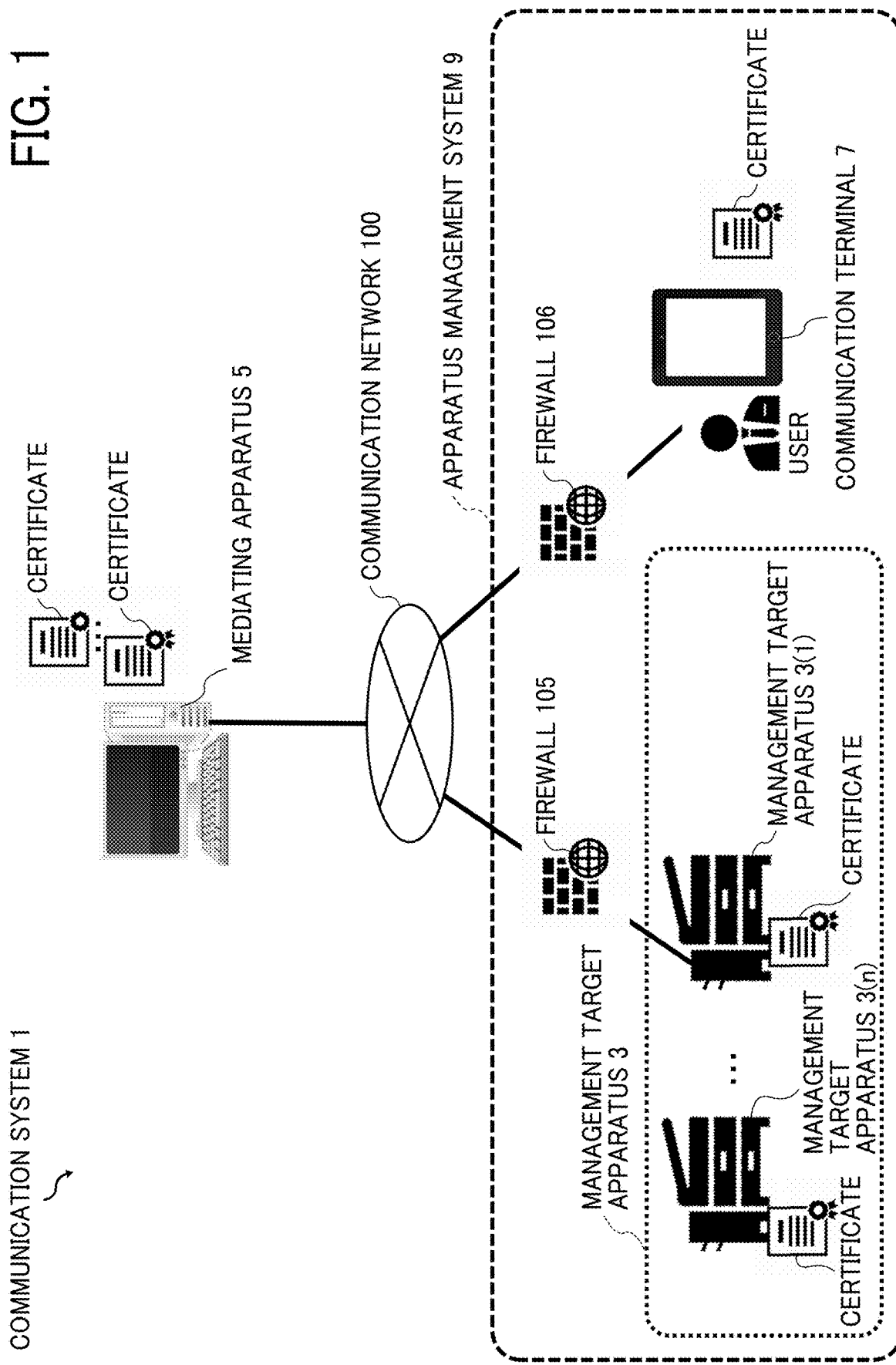

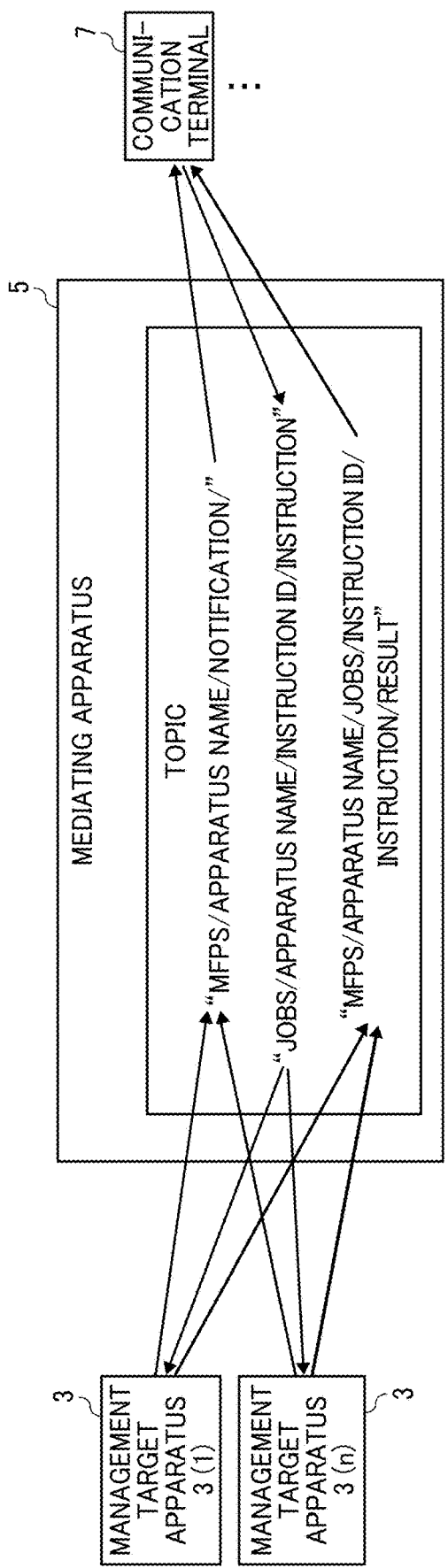

FIG. 8A

| STATUS ID | STATUS |
|---|---|
| SID001 | FIRMWARE UPDATE |
| SID002 | SYSTEM ERROR |
| SID003 | PERIODICAL PROCESS RESULT |
| SID004 | USAGE STATUS/POWER MODE |
| ... | ... |

FIG. 8B

| PROCESS ID | PROCESS |
|---|---|
| PID001 | FIRMWARE UPDATE |
| PID002 | RESTART |
| PID003 | PERIODICAL PROCESS |
| PID004 | TRANSITION TO AND RETURN FROM POWER SAVE MODE |
| ... | ... |

FIG. 8C

| RESULT ID | RESULT |
|---|---|
| RID001 | SUCCESS |
| RID002 | FAILURE |

FIG. 9A

| STATUS ID | STATUS |
|---|---|
| SID001 | FIRMWARE UPDATE |
| SID002 | SYSTEM ERROR |
| SID003 | PERIODICAL PROCESS RESULT |
| SID004 | USAGE STATUS/POWER MODE |
| ... | ... |

FIG. 9B

| PROCESS ID | PROCESS |
|---|---|
| PID001 | FIRMWARE UPDATE |
| PID002 | RESTART |
| PID003 | PERIODICAL PROCESS |
| PID004 | TRANSITION TO AND RETURN FROM POWER SAVE MODE |
| ... | ... |

FIG. 9C

| RESULT ID | RESULT |
|---|---|
| RID001 | SUCCESS |
| RID002 | FAILURE |

FIG. 10A

| STATUS ID | STATUS |
|---|---|
| SID001 | FIRMWARE UPDATE |
| SID002 | SYSTEM ERROR |
| SID003 | PERIODICAL PROCESS RESULT |
| SID004 | USAGE STATUS/POWER MODE |
| ... | ... |

FIG. 10B

| PROCESS ID | PROCESS |
|---|---|
| PID001 | FIRMWARE UPDATE |
| PID002 | RESTART |
| PID003 | PERIODICAL PROCESS |
| PID004 | TRANSITION TO AND RETURN FROM POWER SAVE MODE |
| ... | ... |

FIG. 10C

| RESULT ID | RESULT |
|---|---|
| RID001 | SUCCESS |
| RID002 | FAILURE |

APPARATUS MANAGEMENT SYSTEM, MANAGEMENT TARGET APPARATUS, AND MANAGEMENT METHOD

CROSS-REFERENCE TO RELATED APPLICATIONS

This patent application is based on and claims priority pursuant to 35 U.S.C. § 119(a) to Japanese Patent Application No. 2020-195288, filed on Nov. 25, 2020, in the Japan Patent Office, the entire disclosure of which is hereby incorporated by reference herein.

BACKGROUND

Technical Field

The present disclosure relates to an apparatus management system, a management target apparatus, and a management method.

Related Art

Conventionally, technique such as machine-to-machine (M2M) in which machines exchange information through communication, and internet of things (IoT) in which a wide variety of machines such as home appliances and automobiles are connected to the internet and exchange information with each other, is known. Further, in order to implement M2M and IoT, a communication protocol called Message Queueing Telemetry Transport (MQTT) is known. Message Queueing refers to a method of temporarily holding data sent by a transmission side in a data area and moving to a next process without waiting for a process on a reception side to be completed. Telemetry Transport refers to communication for telemetry. The MQTT is used as the communication protocol that can efficiently transmit data collected by a remote sensor, device, or the like without considering about status of process on the reception side.

On the other hand, in a message delivered between a publisher who transmits the message using the MQTT protocol and a subscriber who receives the message, to achieve distribution of process by having all subscribers process the same message, a technique that executes processing according to priority is known.

SUMMARY

Embodiments of the present disclosure describe an apparatus management system, a management target apparatus, and a management method. The apparatus management system includes a plurality of management target apparatuses each configured to provide apparatus information of own apparatus and a communication terminal configured to receive apparatus status information included in the apparatus information received from each of the plurality of management target apparatuses, the apparatus status information indicating status of the management target apparatus, using a predetermined communication protocol. Each of the plurality of the management target apparatuses receives process information indicating a predetermined process for each of the plurality of management target apparatuses, created based on the apparatus status information transmitted from the communication terminal through a mediating apparatus that mediates between the plurality of management target apparatuses and the communication terminal, and executes the predetermined process indicated by the process information when the process information includes own apparatus identification information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a diagram illustrating an example of an overall configuration of a communication system according to embodiments of the present disclosure;

FIG. 3 is a diagram illustrating an example of a messaging model using the MQTT protocol performed between a management target apparatus, a mediating apparatus, and a communication terminal;

FIG. 8A is a conceptual diagram illustrating an example of a status information table;

FIG. 8B is a conceptual diagram illustrating an example of a process information table;

FIG. 8C is a conceptual diagram illustrating an example of a process result table;

FIG. 9A is a conceptual diagram illustrating an example of the status information table;

FIG. 9B is a conceptual diagram illustrating an example of the process information table;

FIG. 9C is a conceptual diagram illustrating an example of the process result table;

FIG. 10A is a conceptual diagram illustrating an example of the status information table;

FIG. 10B is a conceptual diagram illustrating an example of the process information table;

FIG. 10C is a conceptual diagram illustrating an example of the process result table;

Figure 2A:
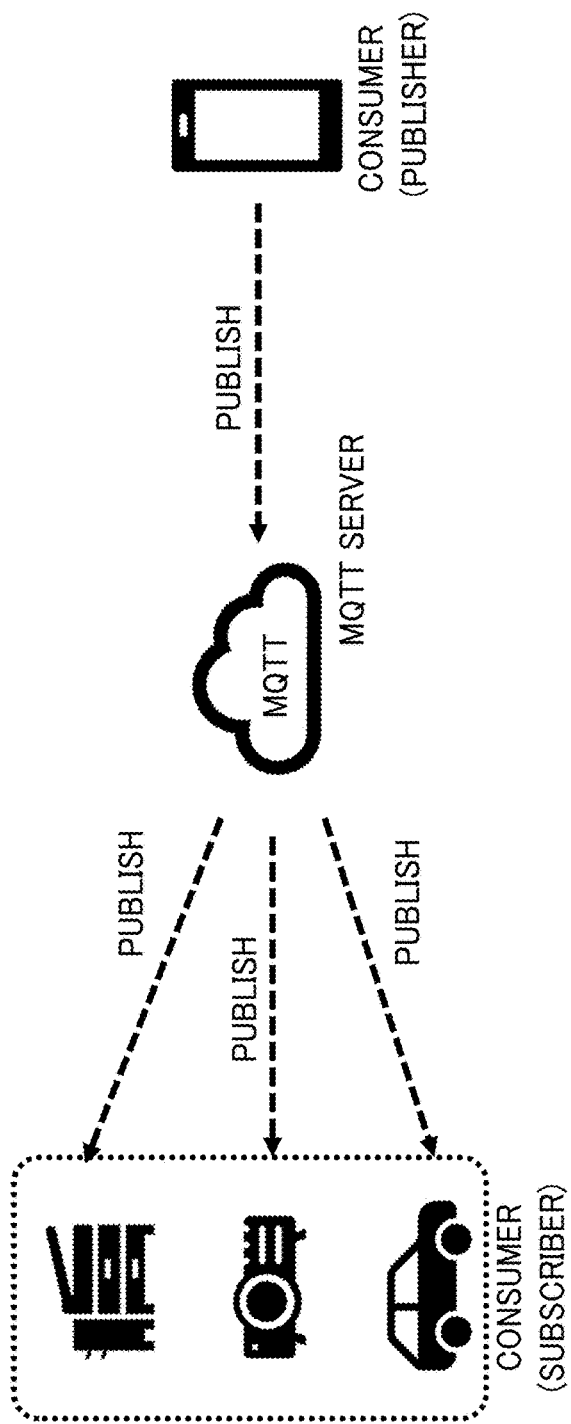
FIG. 2A is a diagram illustrating an example of a concept of publish messaging model related to a MQTT protocol.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, the embodiments of the present disclosure are described with reference to the drawings. In the description of the drawings, redundant description is omitted.

The present embodiment is described with reference to FIGS. 1 to 11. FIG. 1 is a diagram illustrating an example of an overall configuration of a communication system according to the present embodiment. The communication system 1 illustrated in FIG. 1 includes a plurality of management target apparatuses 3, a mediating apparatus 5, and a communication terminal 7. The communication system 1 may include a plurality of communication terminals 7. The plurality of management target apparatuses 3 are communicably connected to the mediating apparatus 5 through the firewall 105 and the communication network 100. Further, the communication terminal 7 is communicably connected to the mediating apparatus 5 through the firewall 106 and the communication network 100. The communication network 100 is implemented by the internet, a mobile communication network, a local area network (LAN), or the like. The communication network 100 may include, in addition to a wired communication, a wireless communication in compliance with, for example, Third Generation (3G), Fourth Generation (4G), Fifth Generation (5G), Worldwide Interoperability for Microwave Access (WiMAX), and Long Term Evolution (LTE). Further, the communication system 1 includes an apparatus management system 9 including the plurality of management target apparatuses 3 and the communication terminal 7.

The management target apparatus 3 provides status information of the apparatus and executes a given process. The management target apparatus 3 includes, for example, an image forming apparatus (multifunction peripheral (MFP)) using an electrophotographic method, the image forming apparatus using an inkjet method, an industrial printing machine, and a commercial printing machine, and the like. Further, the management target apparatus 3 includes various communication devices such as an interactive whiteboard (IWB) that connects to and communicates with a personal computer (PC), a video conference system (unified communication system (UCS)), and a projector, a vehicle, and the like. When a vehicle is used as the management target apparatus 3, an automobile communication network such as a Controller Area Network (CAN) or a Local Interconnect Network (LIN) is used as the communication network 100.

The mediating apparatus 5 mediates the plurality of management target apparatuses 3 and the communication terminal 7 and is also called an MQTT broker in the MQTT communication protocol described below. The mediating apparatus 5 is connected to the plurality of management target apparatuses 3 through the communication network 100 and the firewall 105. Further, the mediating apparatus 5 is connected to the communication terminal 7 through the communication network 100 and the firewall 106.

The communication terminal 7 is implemented by one or more information processing apparatuses (computer systems) equipped with a general server operating system (OS) or the like. The communication terminal 7 receives apparatus status information indicating the status of the management target apparatus 3, transmits process information indicating a predetermined process based on the received apparatus status information through the mediating apparatus 5, and causes the management target apparatus 3 to execute the predetermined process. The communication terminal 7 may be, for example, a communication terminal including a communication function such as a smartphone, a tablet terminal, a personal digital assistant (PDA), or a wearable PC (sunglasses type, wristwatch type, etc.). For example, a terminal operating software such as browser software is used as the communication terminal.

The MQTT as an example of the communication protocol used in the present embodiment enables asynchronous one-to-many communication by a publish messaging model and a subscribe messaging model described below. In addition, the MQTT is a simple protocol specification suitable for use in environments such as IoT and M2M where memory and network bandwidth are limited.

Figure 2B:
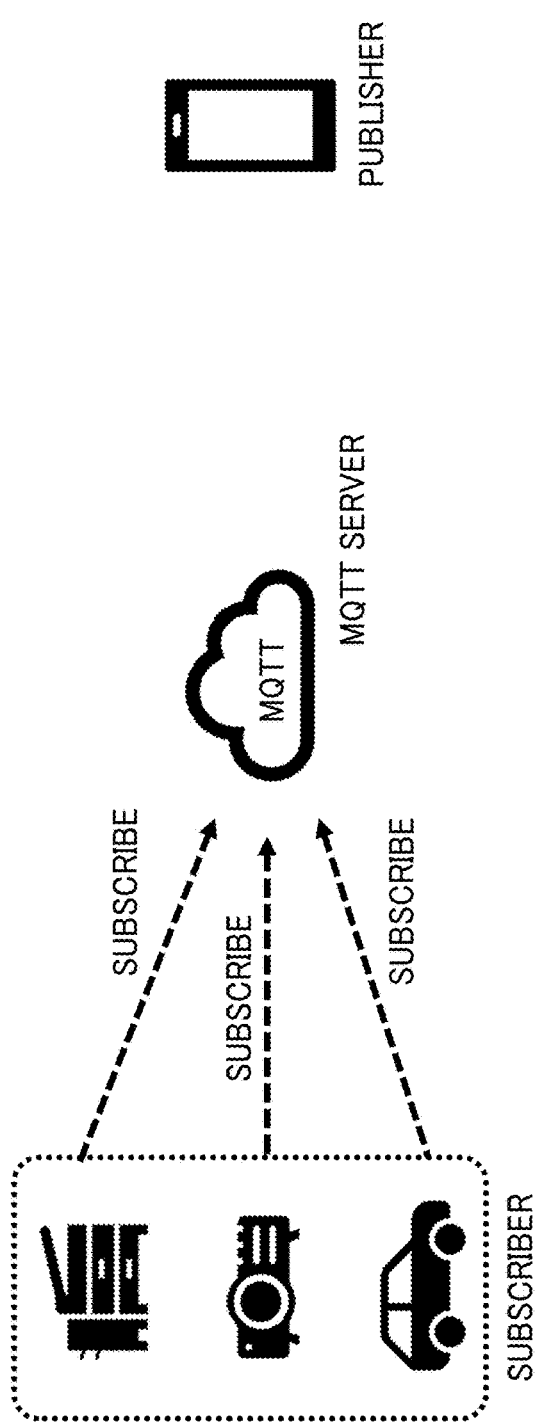
FIG. 2B is a diagram illustrating an example of a concept of subscribe messaging model related to the MQTT protocol.

FIGS. 2A and 2B are diagrams illustrating examples of the concept of the publish messaging model and the subscribe messaging model. FIG. 2A is a diagram illustrating an example of the concept of the publish messaging model related to the MQTT protocol. A node that sends a message and a node that receives the message are commonly referred to as a consumer. The consumer (subscriber) includes, for example, the MFP, the projector, the vehicle, and the like. The MQTT server relays the message. In other words, MQTT server acts as a mediating apparatus between a sender and a receiver of the message.

When sending a message to the MQTT server, publisher doesn't need to know which subscriber the sent message will reach, how many subscribers the message will reach, and so on. Subscribers, on the other hand, can receive any desired message without knowing from which publisher the message comes from. As described above, the MQTT server connects publisher and subscriber which do not know each other.

FIG. 2B is a diagram illustrating an example of the concept of the subscribe messaging model related to the MQTT protocol. The MQTT server asks the subscriber to indicate what kind of message is desired in advance. This is called to subscribe or a subscription. The MQTT server sorts the messages delivered from the publisher based on the information at the time of subscription, and appropriately sends the messages to the subscriber. Delivering a message from the publisher to the MQTT server and delivering a message from the MQTT server to the subscriber are called publish. Furthermore, the key that MQTT server uses when sorting messages is called a topic. The MQTT message includes the topic. The MQTT server sorts the messages by topic and delivers the messages. In FIG. 2B, a mobile terminal such as a smartphone can be considered as an example of the publisher, and the above-mentioned MFP, the projector, the vehicle, or the like can be considered as an example of the subscriber. As illustrated in FIG. 2B, the MFP, projector, vehicle, etc. as the subscriber subscribe to the MQTT server.

The topic in the MQTT message is separated by a slash (1). The topic expresses a hierarchical structure by a separation indicated by the slash. For example, content of a message is expressed by the following three types of topic;
  (1) abc/def/ghi
  (2) abc/def/jkl
  (3) abc/mnop/qrst.

For example, a topic indicating firmware update status of a certain MFP is indicated by, status/MFP/FWupdate.

FIG. 3 is a diagram illustrating an example of a messaging model using the MQTT protocol performed between the management target apparatus, the mediating apparatus, and the communication terminal. As illustrated in FIG. 3, the management target apparatus 3 and the communication terminal 7 subscribe each topic from the mediating apparatus 5. Hereinafter, any management target apparatus among the management target apparatuses 3 (*l*) through 3 (*n*) may be described as the management target apparatus 3.

All the management target apparatuses 3 (*l*) through 3 (*n*) in FIG. 3 each hold a client certificate issued by the mediating apparatus 5 and can access the mediating apparatus 5 residing in the external network. Further, an "apparatus name" is registered for each of the plurality of management target apparatuses 3. The management target apparatus 3 receives update information of application or firmware from a service center or the like of a company that manages the management target apparatus 3. Further, the management target apparatus 3 publishes a topic (sends a message) when an error occurs in the own apparatus. The topic, for example, is "mfps/apparatus name/notification".

The topics can be expressed hierarchically and the communication terminal 7 can be set to subscribe (receive messages) "mfps/#" using a wild card (#). As a result, the communication terminal 7 can receive all the messages from all the management target apparatuses 3. By doing so, if the topic to be subscribed to by the management target apparatus 3 is specified as, for example, "jobs/apparatus name/#", the communication terminal 7 can receive all messages of topics including jobs and the names of the apparatuses.

Further, when the communication terminal 7 issues an instruction such as updating the firmware to a specific management target apparatus after receiving the notification from the management target apparatus 3, the topic is "jobs/apparatus name/instruction identifier (ID)/instruction". By doing so, the communication terminal 7 can issue the instruction to the specific management target apparatus.

After the instruction from the communication terminal 7 is completed, the management target apparatus 3 transmits a message of "mfps/apparatus name/jobs/instruction ID/instruction/result" as a topic. Information such as whether the instruction was successful is indicated in the result included in the topic. Further, the communication terminal 7 can determine which instruction is completed based on the content of the instruction ID.

Figure 4:
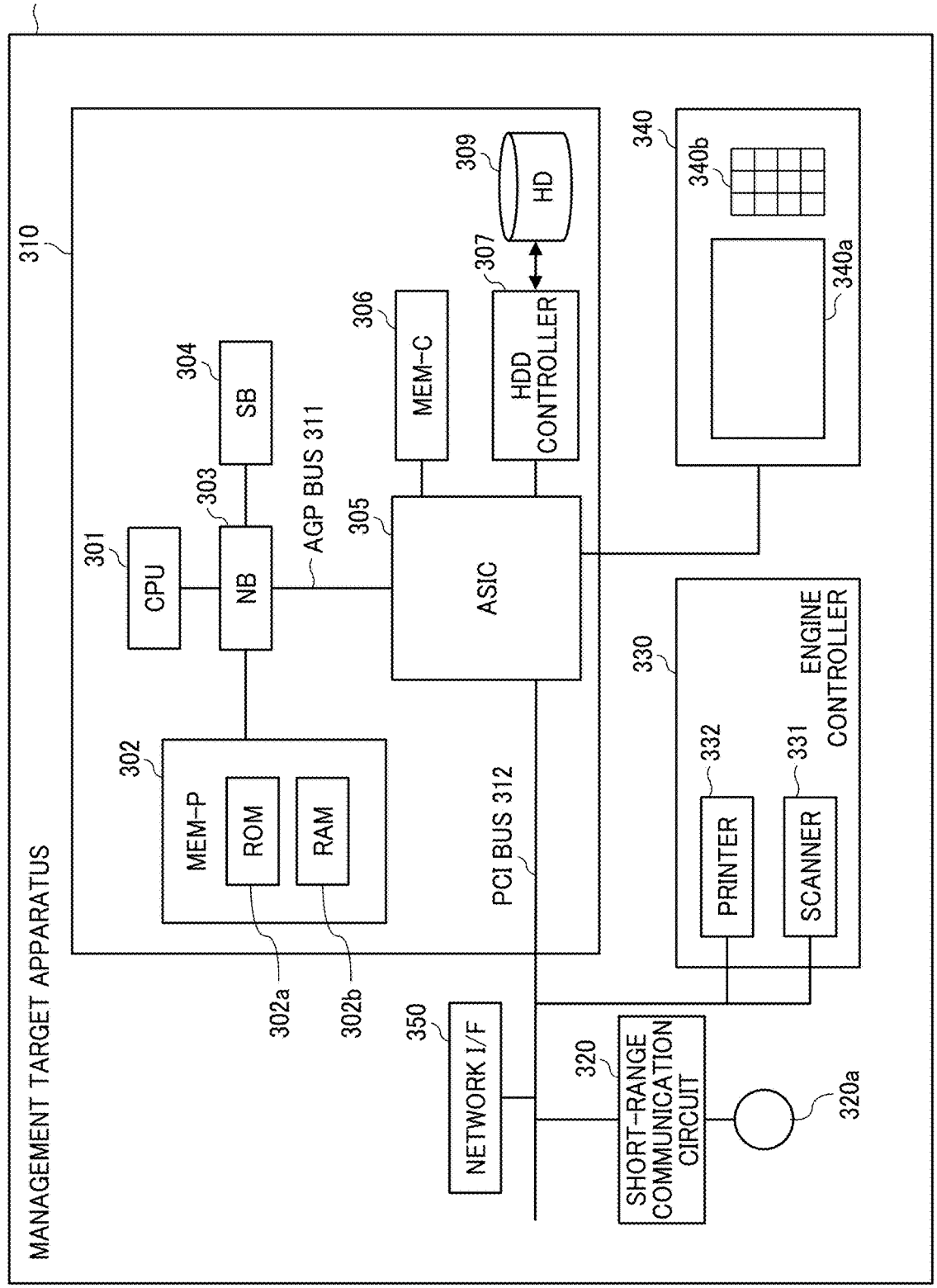
FIG. 4 is a block diagram illustrating an example of a hardware configuration of the management target apparatus according to embodiments of the present disclosure.

FIG. 4 is a block diagram illustrating an example of a hardware configuration of the management target apparatus 3 according to the present embodiment. As illustrated in FIG. 4, the management target apparatus 3 includes a controller 310, a short-range communication circuit 320, an engine controller 330, a control panel 340, and a network interface (I/F) 350.

The controller 310 includes a central processing unit (CPU) 301 as a main processor, a system memory (MEM-P) 302, a north bridge (NB) 303, a south bridge (SB) 304, an Application Specific Integrated Circuit (ASIC) 305, a local memory (MEM-C) 306, a hard disk drive (HDD) controller 307, and a hard disk (HD) 309 as a storage unit. The NB 303 and the ASIC 305 are connected through an Accelerated Graphics Port (AGP) bus 311.

The CPU 301 controls the overall operation of the management target apparatus 3. The NB 303 connects the CPU 301 with the MEM-P 302, SB 304, and AGP bus 311. The NB 303 includes a memory controller for controlling reading or writing of various data with respect to the MEM-P 302, a Peripheral Component Interconnect (PCI) master, and an AGP target.

The MEM-P 302 includes a read only memory (ROM) 302*a* that is a memory for storing programs and data that implements each function of the controller 310, and a RAM 302*b* that is used as a memory for expanding programs and data, a memory for drawing at the time of printing, and the like. The program stored in the RAM 302*b* may be provided as a file in an installable format or an executable format by recording the program on a computer-readable recording medium such as a compact disc read only memory (CD-ROM), compact disc-recordable (CD-R), or digital versatile disk (DVD). Further, the program stored in the RAM 302*b* may be provided as a program (application) installed through a communication line such as the internet.

The SB 304 is a bridge for connecting the NB 303 to PCI devices and peripheral devices. The ASIC 305 is an integrated circuit (IC) for image processing applications including hardware elements for image processing and has a role of a bridge connecting the AGP bus 311, PCI bus 312, HDD controller 307, and MEM-C 306, respectively. The ASIC 305 includes a PCI target and an AGP master, an arbiter that arbitrates the drive timing of each signal according to a fixed priority in the ASIC 305, a memory controller that controls the MEM-C 306, rotation of image data by hardware logic, and the like. A plurality of Direct Memory Access Controllers (DMACs) for performing data transfer to and from the scanner 331 and the printer 332 through the PCI bus 312 are included. A Universal Serial Bus (USB) interface or an Institute of Electrical and Electronics Engineers 1394 (IEEE 1394) interface may be connected to the ASIC 305.

The MEM-C 306 is a local memory used as a buffer for image data to be copied or a code buffer. The HD 309 is a storage for storing image data, font data used during printing, and forms. The HDD controller 307 controls reading or writing of data to the HD 309 according to the control of the CPU 301. The AGP bus 311 is a bus interface for a graphics accelerator card, which has been proposed to accelerate graphics process. Through directly accessing the MEM-P 302 by high-throughput, speed of the graphics accelerator card is improved.

The short-range communication circuit 320 is a communication circuit such as Near Field Communication (NFC) or BLUETOOTH (registered trademark). The short-range communication circuit 320 is provided with an antenna 320a for the short-range communication circuit.

Further, the engine controller 330 includes a scanner 331 and a printer 332. The control panel 340 includes a display panel 340a and an operation panel 340b. The display panel 340a is implemented by, for example, a touch panel that displays current settings or a selection screen and receives a user input. The operation panel 340b includes a numeric keypad that receives set values of various image forming parameters such as image density parameter and a start key that accepts an instruction for starting copying. The controller 310 controls entire operation of the management target apparatus 3. For example, the controller 310 controls rendering, communication, or user input to the control panel 340. The scanner 331 or the printer 332 includes an image process portion such as error diffusion and gamma (γ) conversion.

In response to an instruction to select a specific application through the control panel 340, for example, using a mode switch key, the management target apparatus 3 selectively performs a document box function, a copy function, a print function, and a facsimile function. The document box mode is selected when the document box function is selected, the copy mode is selected when the copy function is selected, the printer mode is selected when the printer function is selected, and the facsimile mode is selected when the facsimile function is selected.

The network I/F 350 controls communication of data with an external device through the communication network 100. The short-range communication circuit 320 and the network I/F 350 are electrically connected to the ASIC 305 through the PCI bus 312.

Any one of the above-described control programs may be recorded in a file in a format installable or executable on a computer-readable storage medium for distribution. Examples of the storage medium include, but not limited to the CD-R, DVD, BLU-RAY (registered trademark) disc, secure digital (SD) card, USB memory, and the like. In addition, such storage medium may be provided in a form of a program product to users within a certain country or outside that country. For example, the management target apparatus 3 implements the management target execution method according to the present disclosure by executing the program according to the present disclosure.

Figure 5:
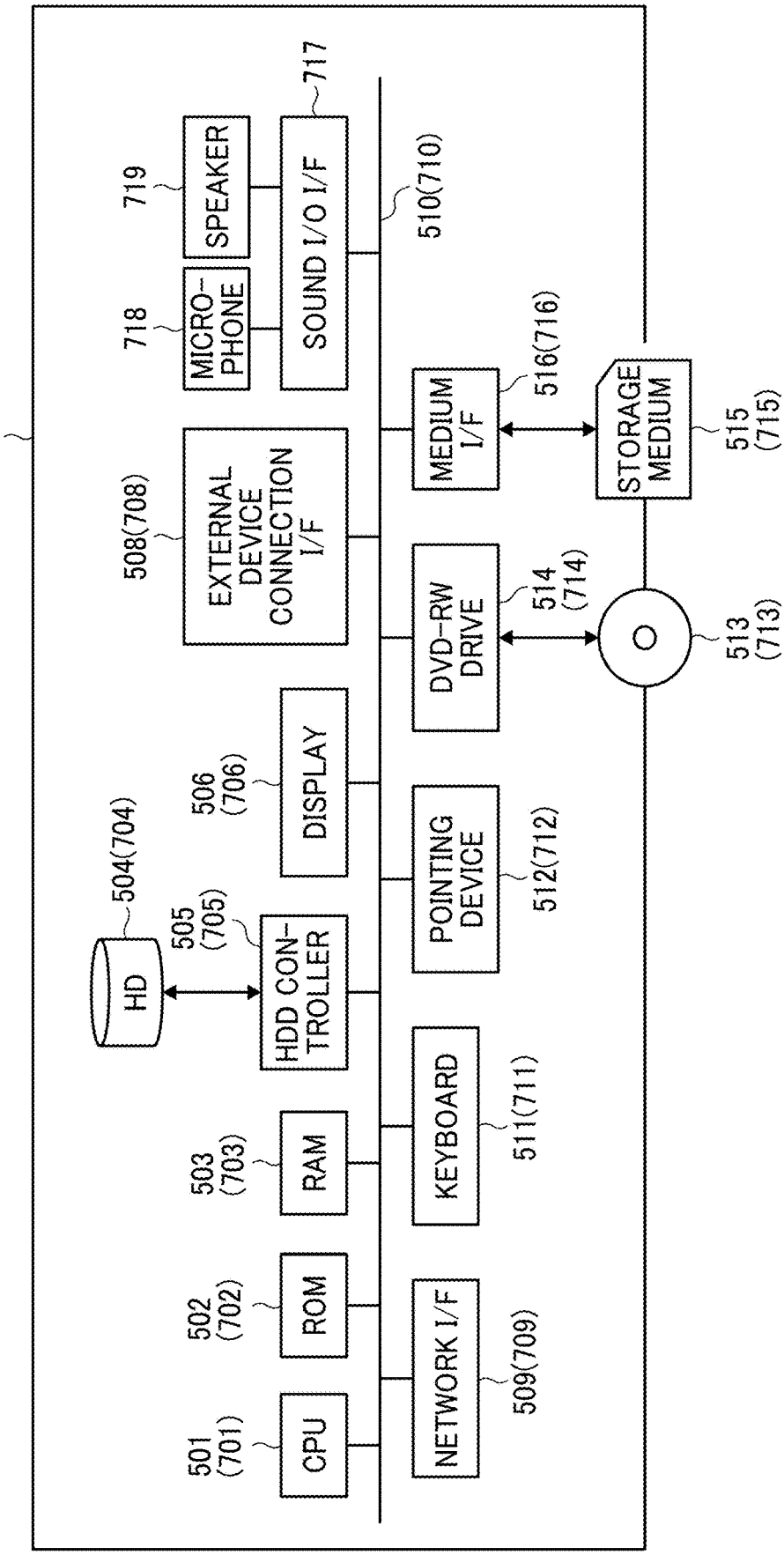
FIG. 5 is a block diagram illustrating an example of a hardware configuration of the mediating apparatus and the communication terminal according to embodiments of the present disclosure.

FIG. 5 is a block diagram illustrating an example of a hardware configuration of a mediating apparatus and a communication terminal according to the present embodiment. The mediating apparatus 5 is implemented by a computer, and as illustrated in FIG. 5, includes a CPU 501, a ROM 502, a RAM 503, an HD 504, an HDD controller 505, a display 506, an external device connection I/F 508, a network I/F 509, a bus line 510, a keyboard 511, a pointing device 512, a digital versatile disk-rewritable (DVD-RW) drive 514, and a medium I/F 516.

The CPU 501 controls the overall operation of the mediating apparatus 5. The ROM 502 stores a program such as an initial program loader (IPL) used for driving the CPU 501. The RAM 503 is used as a work area for the CPU 501. The HD 504 stores various data such as programs. The HDD controller 505 controls reading or writing of various data to the HD 504 according to the control of the CPU 501. The display 506 displays various information such as cursors, menus, windows, characters, or images. In one example, the display 506 is a touch panel display provided with an input device. The external device connection I/F 508 is an interface for connecting various external devices. The external device in this case is, for example, a USB memory or a printer. The network I/F 509 is an interface for performing data communication using the communication network 100. The bus line 510 is an address bus, a data bus, or the like for electrically connecting each component such as the CPU 501 illustrated in FIG. 5.

The keyboard 511 is one example of an input device provided with a plurality of keys for enabling a user to input characters, numerals, or various instructions. The pointing device 512 is another example of the input device that allows a user to select or execute a specific instruction, select a target for processing, or move a cursor being displayed. The input device is not limited to the keyboard 511 and the pointing device 512, and may be a touch panel, a voice input device, or the like. The DVD-RW drive 514 reads and writes various data from and to a DVD-RW 513, which is an example of a removable storage medium. The removable storage medium is not limited to the DVD-RW and may be a digital versatile disk-recordable (DVD-R) or a BLU-RAY (registered trademark) Disc, or the like. The medium I/F 516 controls reading and writing operation (storing) of data from and to a storage medium 515 such as the flash memory.

As illustrated in FIG. 5, the communication terminal 7 is implemented by a computer including a CPU 701, a ROM 702, a RAM 703, an HD 704, an HDD controller 705, a display 706, an external device connection I/F 708, a network I/F 709, a bus line 710, a keyboard 711, a pointing device 712, a DVD-RW drive 714, a medium I/F 716, a sound input/output (I/O) I/F 717, a microphone 718, and a speaker 719. The CPU 701, ROM 702, RAM 703, HD 704, HDD controller 705, display 706, external device connection I/F 708, network I/F 709, bus line 710, keyboard 711, pointing device 712, and DVD-RW drive 714 have the same configuration as each component of the mediating apparatus 5, and the description of each hardware configuration is omitted.

The microphone 718 is a kind of built-in sound collecting device for inputting voice (sound signal). The speaker 719 is a kind of audio output device for outputting voice (sound signal). The sound I/O I/F 717 is a circuit for inputting or outputting the sound signal to the microphone 718 or from the speaker 719 under control of the CPU 701.

Any one of the above-described control programs may be recorded in a file in a format installable or executable on a computer-readable storage medium for distribution. Examples of the storage medium include, but not limited to the CD-R, DVD, BLU-RAY (registered trademark) disc, secure digital (SD) card, USB memory, and the like. In addition, such storage medium may be provided in a form of a program product to users within a certain country or outside that country.

Figure 6:
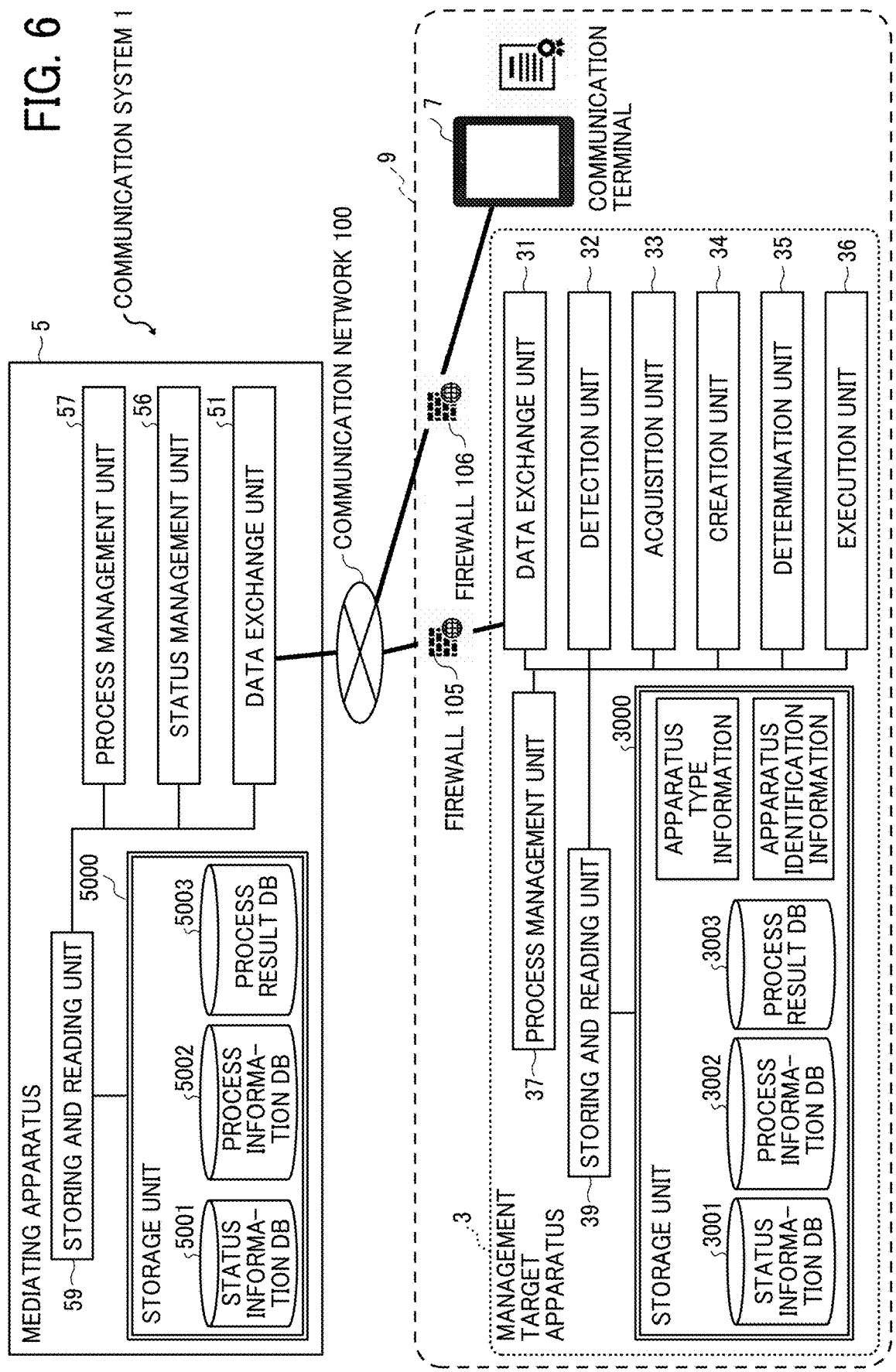
FIG. 6 is a block diagram illustrating an example of a functional configuration of the communication system according to embodiments of the present disclosure.

With reference to FIGS. 6 to 11, a functional configuration of the present embodiment is described. FIG. 6 is a block diagram illustrating an example of the functional configuration of the communication system according to the present embodiment.

As illustrated in FIG. 6, the management target apparatus 3 includes a data exchange unit 31, a detection unit 32, an acquisition unit 33, a creation unit 34, a determination unit 35, an execution unit 36, a process management unit 37, and a storing and reading unit 39. Each of these functional units is implemented by an instruction from the CPU 301 according to a program for the management target apparatus 3 expanded in the RAM 302b from at least one of the ROM 302a and the HD 309 in any of the components illustrated in FIG. 4. Further, the management target apparatus 3 includes a storage unit 3000 implemented by at least one of the ROM 302a and the HD 309 illustrated in FIG. 4.

FIG. 8A is a conceptual diagram illustrating an example of a status information table. In the storage unit 3000, a status information database (DB) 3001 storing a status information table as illustrated in FIG. 8A is implemented. In the status information table, a status indicating status of the management target apparatus 3 is stored in association with each status ID. The status ID is status identification information indicating the status of the management target apparatus 3. Further, the status include, for example, firmware update, system error, periodic process result, usage status/power mode. Information indicating the status is treated as apparatus status information.

FIG. 8B is a conceptual diagram illustrating an example of a process information table. In the storage unit 3000, a process information DB 3002 storing the process information table as illustrated in FIG. 8B is implemented. In the process information table, a process executed by the management target apparatus 3 is stored in association with each process ID. The process ID is process identification information indicating the process executed by the management target apparatus 3. The process includes, for example, firmware update, restart, periodic process, transition and return to the power mode. Information indicating the process is treated as apparatus process information.

FIG. 8C is a conceptual diagram illustrating an example of a process result table. In the storage unit 3000, a process result DB 3003 storing the process result table as illustrated in FIG. 8C is implemented. In the process result table, a result (success or failure) for each process executed by the management target apparatus 3 is stored in association with a result ID. The result ID is result identification information indicating the result of the process executed by the management target apparatus 3.

In addition to the various management tables described above, the storage unit 3000 stores apparatus type information indicating the type of the management target apparatus 3 and apparatus identification information for identifying the management target apparatus 3. In the present embodiment, each of the above-mentioned status ID (status identification information), process ID (process identification information), result ID (result identification information), apparatus type information, and apparatus identification information is an example of apparatus information provided by the management target apparatus 3.

A functional configuration of the management target apparatus 3 is described in detail. The data exchange unit 31 of the management target apparatus 3 illustrated in FIG. 6 is mainly implemented by the process of the CPU 301, the short-range communication circuit 320, and the network I/F 350 illustrated in FIG. 4 and transmits and receives various data (or information) to and from the mediating apparatus 5 through the firewall 105 and the communication network 100.

The detection unit 32 is mainly implemented by the process of the CPU 301 illustrated in FIG. 4 and the start request and the like of each process performed in the management target apparatus 3 is detected from the status of the program being executed in the own device.

The acquisition unit 33 is mainly implemented by the process of the CPU 301 and at least one of the MEM-P 302 and the HDD controller 307 illustrated in FIG. 4 and acquires the above-mentioned status ID, the apparatus type information, and the apparatus identification information described below. Further, the acquisition unit 33 acquires a character string of each layer included in the received process topic.

The creation unit 34 is mainly implemented by the process of the CPU 301 illustrated in FIG. 4 and creates a status topic to be published to the mediating apparatus 5 and a result topic including the result for each process executed in the management target apparatus 3.

The determination unit 35 is mainly implemented by the process of the CPU 301 illustrated in FIG. 4 and makes various determinations in the management target apparatus 3.

The execution unit 36 is mainly implemented by the process of the CPU 301 illustrated in FIG. 4 and executes the various processes executed by the management target apparatus 3. The various processes include firmware update, restart, periodic process, transition and return to the power mode, and the like managed by the above-mentioned process information table stored in the process information DB 3002 and illustrated in FIG. 8B.

The process management unit 37 mainly manages the results of various processes executed by the management target apparatus 3 which are implemented by the processes of the CPU 301 illustrated in FIG. 4. The result of the various processes is success or failure for each process stored in the process result table stored in the process result DB 3003, illustrated in FIG. 8C, and described above. In addition, the process management unit 37 instructs the execution unit 36 to execute a specified process.

The storing and reading unit 39, which is mainly implemented by the process of the CPU 301 illustrated in FIG. 4, stores various data (or information) in the storage unit 3000 or reads various data (or information) from the storage unit 3000.

As illustrated in FIG. 6, the mediating apparatus 5 includes a data exchange unit 51, a status management unit 56, a process management unit 57, and a storing and reading unit 59. Each of these functional units is implemented by an instruction from the CPU 501 according to a program for the mediating apparatus 5 expanded in the RAM 503 from at least one of the ROM 502 and the HD 504 in any of the components illustrated in FIG. 5. Further, the mediating apparatus 5 includes a storage unit 5000 implemented by at least one of the ROM 502 and HD 504 illustrated in FIG. 5.

FIG. 9A is a conceptual diagram illustrating an example of a status information table. In the storage unit 5000, a status information DB 5001 storing the status information table as illustrated in FIG. 9A is implemented. In the status information table, a status indicating status of the management target apparatus 3 is stored in association with each status ID. The status ID is status identification information indicating the status of the management target apparatus 3 and is also stored in the mediating apparatus 5. The status includes, for example, firmware update, system error, periodic process result, usage status/power mode.

FIG. 9B is a conceptual diagram illustrating an example of a process information table. In the storage unit 5000, a process information DB 5002 storing the process information table as illustrated in FIG. 9B is implemented. In the process information table, a process executed by the management target apparatus 3 is stored in association with each process ID. The process ID is process identification information indicating the process executed by the management target apparatus 3 and is also stored in the mediating apparatus 5. Further, the process includes, for example, firmware update, restart, periodic process, and transition and return to the power mode.

FIG. 9C is a conceptual diagram illustrating an example of a process result table. In the storage unit 5000, a process result DB 5003 storing the process result table as illustrated in FIG. 9C is implemented. In the process result table, a result (success or failure) for each process executed by the management target apparatus 3 is stored in association with a result ID. The result ID is result identification information indicating the result of the process executed by the management target apparatus 3 and is also stored in the mediating apparatus 5.

A functional configuration of the mediating apparatus 5 is described in detail. The data exchange unit 51 of the mediating apparatus 5 illustrated in FIG. 6 is implemented mainly by the process of the CPU 501 and the external device connection I/F 508 and the network I/F 509 illustrated in FIG. 5 and transmits and receives various data (or information) to and from the management target apparatus 3 through the firewall 105 and the communication network 100. Further, the data exchange unit 51 transmits and receives various data (or information) to and from the communication terminal 7 through the firewall 106 and the communication network 100.

The status management unit 56 is mainly implemented by the process of the CPU 501 illustrated in FIG. 5 and manages the status of the management target apparatus 3 and the results for various processes executed by the management target apparatus 3. The status of the management target apparatus 3 is, for example, various status of the management target apparatus 3 stored in the above-mentioned status information table stored in the status information DB 5001 and illustrated in FIG. 9A. Further, the results for various processes are, for example, success or failure for each process stored in the above-mentioned process result table stored in the process result DB 5003 and illustrated in FIG. 9C.

The process management unit 57 is mainly implemented by the process of the CPU 501 illustrated in FIG. 5 and manages various processes executed by the management target apparatus 3. As described above, the process include, for example, firmware update, restart, periodic process, and transition and return to the power mode. The status management unit 56 and the process management unit 57 are not limited to the above-mentioned range of functions. For example, the status management unit 56 may be responsible for the process executed by the process management unit 57, or the process management unit 57 may be responsible for the process executed by the status management unit 56. Further, the status management unit 56 and the process management unit 57 may be executed as one function.

The storing and reading unit 59, which is mainly implemented by the process of the CPU 501 illustrated in FIG. 5, stores various data (or information) in the storage unit 5000 or reads various data (or information) from the storage unit 5000.

Figure 7:
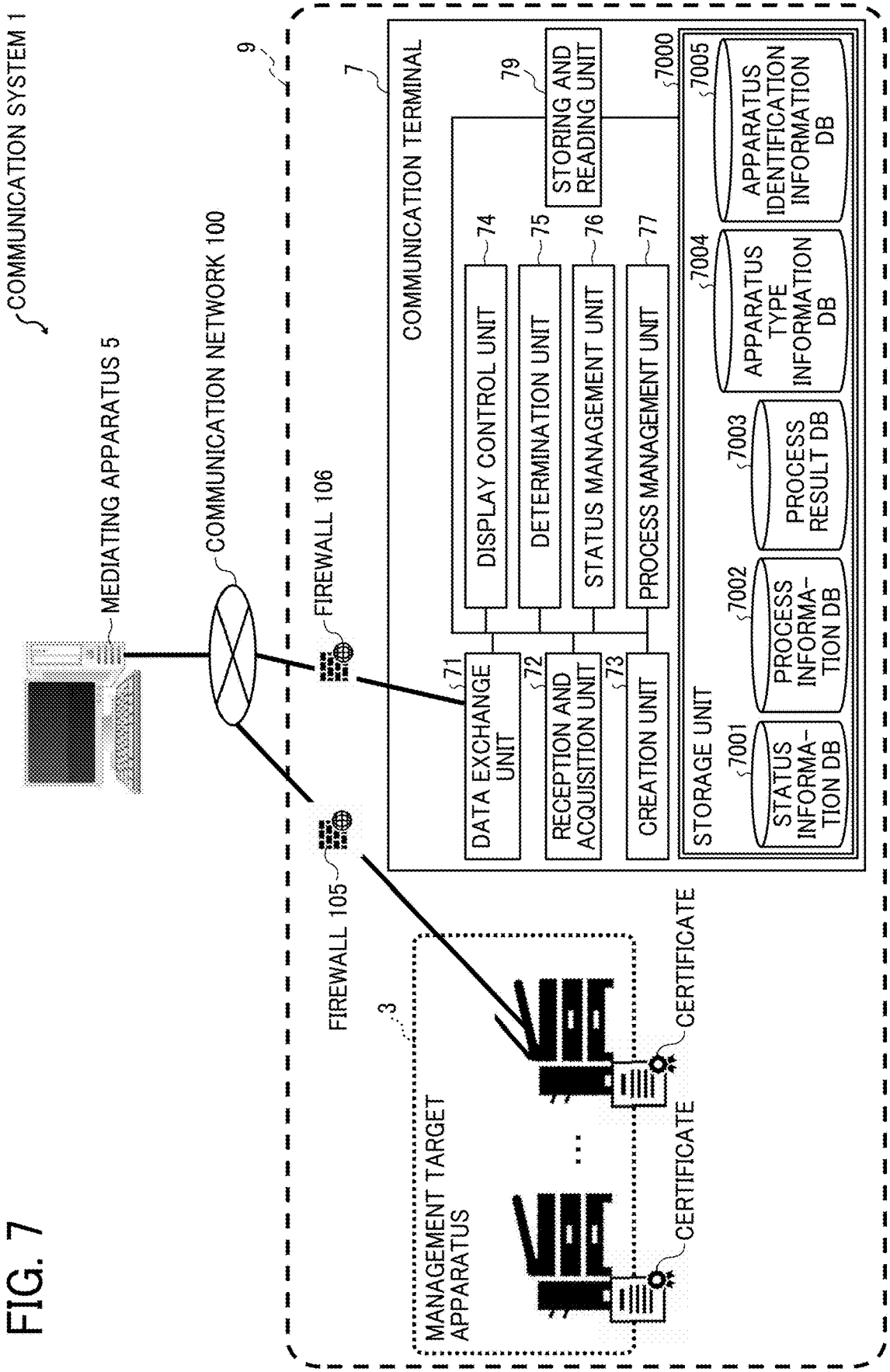
FIG. 7 is a block diagram illustrating an example of a functional configuration of the communication system according to embodiments of the present disclosure.

As illustrated in FIG. 7, the communication terminal 7 includes a data exchange unit 71, a reception and acquisition unit 72, a creation unit 73, a display control unit 74, a determination unit 75, a status management unit 76, a process management unit 77, and a storing and reading unit 79. Each of these functional units is implemented by the instruction from the CPU 701 according to a program for the communication terminal 7 expanded in the RAM 703 from at least one of the ROM 702 and the HD 704 to any of the components illustrated in FIG. 5. Further, the communication terminal 7 includes a storage unit 7000 implemented by at least one of the ROM 702 and the HD 704 illustrated in FIG. 5.

FIG. 10A is a conceptual diagram illustrating an example of a status information table. In the storage unit 7000, a status information DB 7001 storing the status information table as illustrated in FIG. 10A is implemented. In the status information table, a status indicating status of the management target apparatus 3 is stored in association with each status ID. The status ID is the status identification information indicating the status of the management target apparatus 3 and is also stored in the communication terminal 7. The status includes, for example, firmware update, system error, periodic process result, usage status/power mode.

FIG. 10B is a conceptual diagram illustrating an example of a process information table. In the storage unit 7000, a process information DB 7002 storing the process information table as illustrated in FIG. 10B is implemented. In the process information table, a process executed by the management target apparatus 3 is stored in association with each process ID. The process ID is process identification information indicating the process executed by the management target apparatus 3 and is also stored in the communication terminal 7. Further, the process includes, for example, firmware update, restart, periodic process, and transition and return to the power mode.

FIG. 10C is a conceptual diagram illustrating an example of a process result table. In the storage unit 7000, a process result DB 7003 storing the process result table as illustrated in FIG. 10C is implemented. In the process result table, a result (success or failure) for each process executed by the management target apparatus 3 is stored in association with a result ID. The result ID is result identification information indicating the result of the process executed by the management target apparatus 3 and is also stored in the communication terminal 7.

Figure 11A:
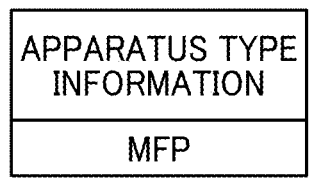
FIG. 11A is a conceptual diagram illustrating an example of an apparatus type information table.

FIG. 11A is a conceptual diagram illustrating an example of an apparatus type information table. In the storage unit 7000, an apparatus type information DB 7004 storing the apparatus type information table as illustrated in FIG. 11A is implemented. In the apparatus type information table, for example, "MFP" is stored and managed as information related to the apparatus type. The information related to the apparatus type (apparatus type information) is not limited to "MFP".

Figure 11B:
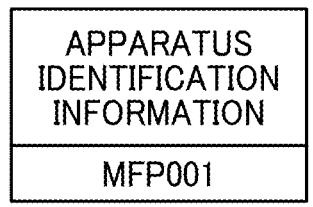
FIG. 11B is a conceptual diagram illustrating an example of an apparatus identification information table.

FIG. 11B is a conceptual diagram illustrating an example of an apparatus identification information table. In the storage unit 7000, an apparatus identification information DB 7005 storing the apparatus identification information table as illustrated in FIG. 11B is implemented. In the apparatus identification information table, for example, "MFP001" is stored as the apparatus identification information. The apparatus identification information is not limited to "MFP001".

A functional configuration of the communication terminal 7 is described in detail. The data exchange unit 71 of the communication terminal 7 illustrated in FIG. 7 is implemented mainly by the processing of the CPU 701 on the external device connection I/F 708 and the network I/F 709 illustrated in FIG. 5 and various data (or information) are transmitted and received to and from the mediating apparatus 5 through the firewall 106 and the communication network 100.

The reception and acquisition unit 72 is mainly implemented by the processing of the CPU 701 on the pointing device 712 illustrated in FIG. 5 and receives the user's operation on the display 706 of the communication terminal 7. Further, the reception and acquisition unit 72 acquires a character string of a predetermined layer included in the status topic published by the mediating apparatus 5 to the communication terminal 7 as described below.

The creation unit 73 is mainly implemented by the processing of the CPU 701 illustrated in FIG. 5 and creates a process topic related to the process (for example, "firmware update" executed in the management target apparatus 3) that matches the status stored in the status information table stored in the status information DB 7001 and illustrated in FIG. 10C. Further, the creation unit 73 creates a status notification screen and an execution result notification screen to be displayed on the display 706 of the communication terminal 7.

The display control unit 74 is mainly implemented by the processing of the CPU 701 illustrated in FIG. 5 and causes the display 706 to display various data (information).

The determination unit 75 is mainly implemented by the processing of the CPU 701 illustrated in FIG. 5 and makes various determinations in the communication terminal 7.

The status management unit 76 is mainly implemented by the processing of the CPU 701 illustrated in FIG. 5 and manages the status of the management target apparatus 3 and the results for various processes executed by the management target apparatus 3. The status of the management target apparatus 3 is various status of the management target apparatus 3 stored in the above-mentioned status information table stored in the status information DB 7001 and illustrated in FIG. 10A. Further, the result for various processes is success or failure for each process stored in the above-mentioned process result table stored in the process result DB 7003 and illustrated in FIG. 10C. Further, the status management unit 76 manages the apparatus type information stored in the above-mentioned apparatus type information table stored in the apparatus type information DB 7004 and illustrated in FIG. 11A and the apparatus identification information table stored in the apparatus identification information DB 7005 and illustrated in FIG. 11B, respectively. Alternatively, the apparatus type information and the apparatus identification information may be managed by the process management unit 77 described below.

The process management unit 77 is mainly implemented by the processing of the CPU 701 illustrated in FIG. 7 and manages various processes executed by the management target apparatus 3. As described above, the process includes, for example, firmware update, restart, periodic process, and transition and return to the power mode. The status management unit 76 and the process management unit 77 are not limited to the above-mentioned range of functions. For example, the status management unit 76 may be responsible for the process executed by the process management unit 77, or the process management unit 77 may be responsible for the process executed by the status management unit 76. Further, the status management unit 76 and the process management unit 77 may be executed as one function.

The storing and reading unit 79 is mainly implemented by the processing of the CPU 701 illustrated in FIG. 5 and stores various data (or information) in the storage unit 7000 or reads various data (or information) from the storage unit 7000.

Each process or operation in the communication system 1 according to the present embodiment is described with reference to FIGS. 12 to 18.

Figure 12:
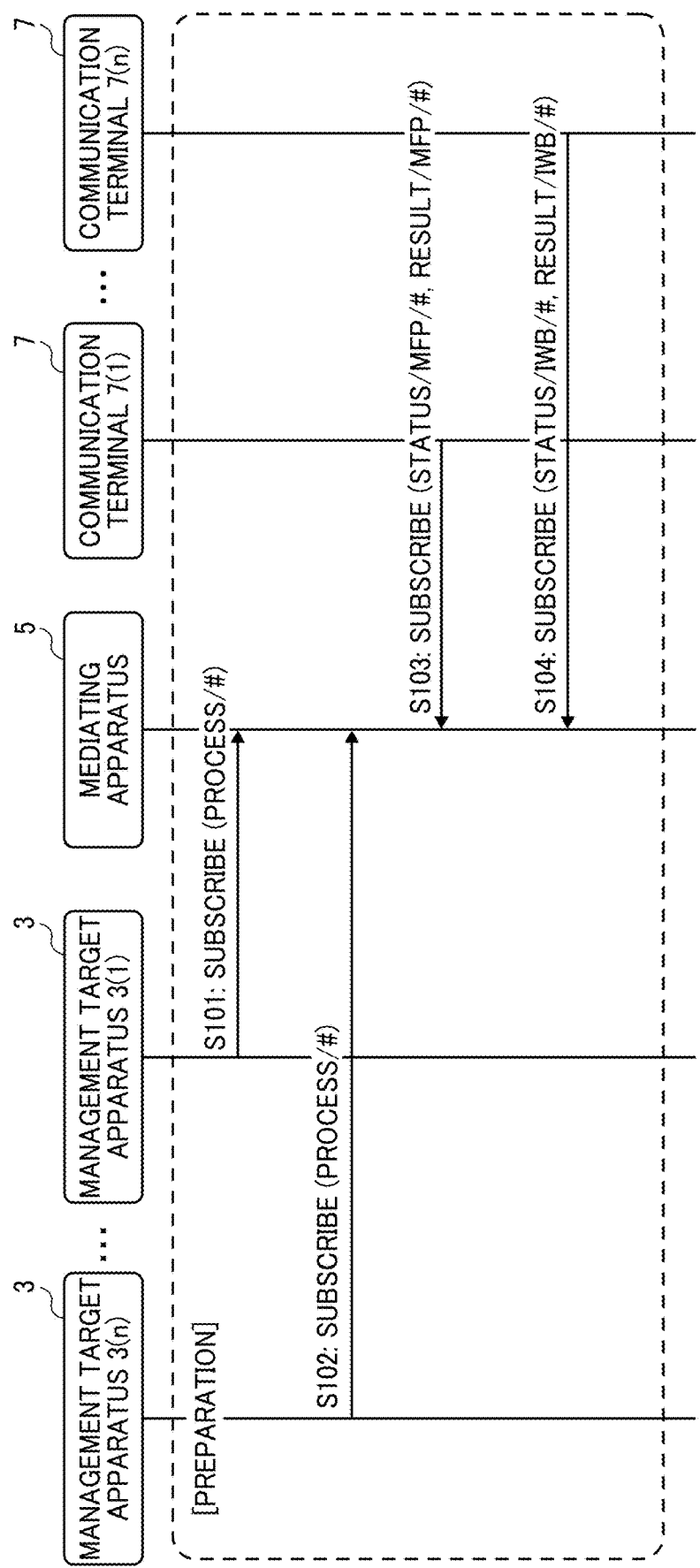
FIG. 12 is a sequence diagram illustrating an example of a preparation process in the communication system.

FIG. 12 is a sequence diagram illustrating an example of preparation process executed by the management target apparatus, the mediating apparatus, and the communication terminal. As illustrated in FIG. 12, in step S101, the data exchange unit 31 of the management target apparatus 3 (*l*) subscribes to the mediating apparatus 5. Accordingly, the data exchange unit 51 of the mediating apparatus 5 receives the subscription transmitted from the management target apparatus 3 (*l*). Here, the topic to be subscribed includes, for example, information indicated by process/#.

In step S102, the data exchange unit 31 of the management target apparatus 3 (*n*) subscribes to the mediating apparatus 5. Accordingly, the data exchange unit 51 of the mediating apparatus 5 receives the subscription transmitted from the management target apparatus 3 (*n*). Here, the topic to be subscribed includes, for example, the information indicated by process/#. The topics subscribed in steps S101 and S102 (for example, "process") are examples of the process request information for receiving the process indicated as the process information. Step S102 executed by the management target apparatus 3 (*n*) may be executed before step S101 executed by the management target apparatus 3 (*l*). Hereinafter, management target apparatuses 3 (*l*) to 3 (*n*) are simply referred to as a management target apparatus 3 unless otherwise specified.

In step S103, the data exchange unit 71 of the communication terminal 7 (*l*) subscribes to the mediating apparatus 5. Accordingly, the data exchange unit 51 of the mediating apparatus 5 receives the subscription transmitted from the communication terminal 7 (*l*). Here, the topic to be subscribed includes, for example, information indicated by status/MFP/#and result/MFP/#.

In step S104, the data exchange unit 71 of the communication terminal 7 (*n*) subscribes to the mediating apparatus 5. Accordingly, the data exchange unit 51 of the mediating apparatus 5 receives the subscription transmitted from the communication terminal 7 (*n*). At this time, the topic to be subscribed includes, for example, information indicated by status/IWB/#, and result/IWB/#. Step S104 executed by the communication terminal 7 (*n*) may be executed before step S103 executed by the communication terminal 7 (*l*). The communication terminals 7 (*l*) to 7 (*n*) are simply referred to as a communication terminal 7 unless otherwise specified.

In the present embodiment, the following is used as examples of the topic.

status/apparatus type information/apparatus identification information/status ID
 process/apparatus identification information/process ID
 result/apparatus type information/apparatus identification information/result ID The first character strings, which are status, process, and result, are regarded as first layer data (character strings), respectively. The apparatus type information and the apparatus identification information, which are the character strings separated by a first slash (/), are each regarded as the data (character string) of a second layer. The apparatus identification information and the process ID and the apparatus identification information, which are the character strings separated by a second slash (/), are each regarded as the data (character string) of a third layer. The status ID and the result ID, which are the character strings separated by a third slash (/), are regarded as the data (character string) of a fourth layer.

Figure 13:
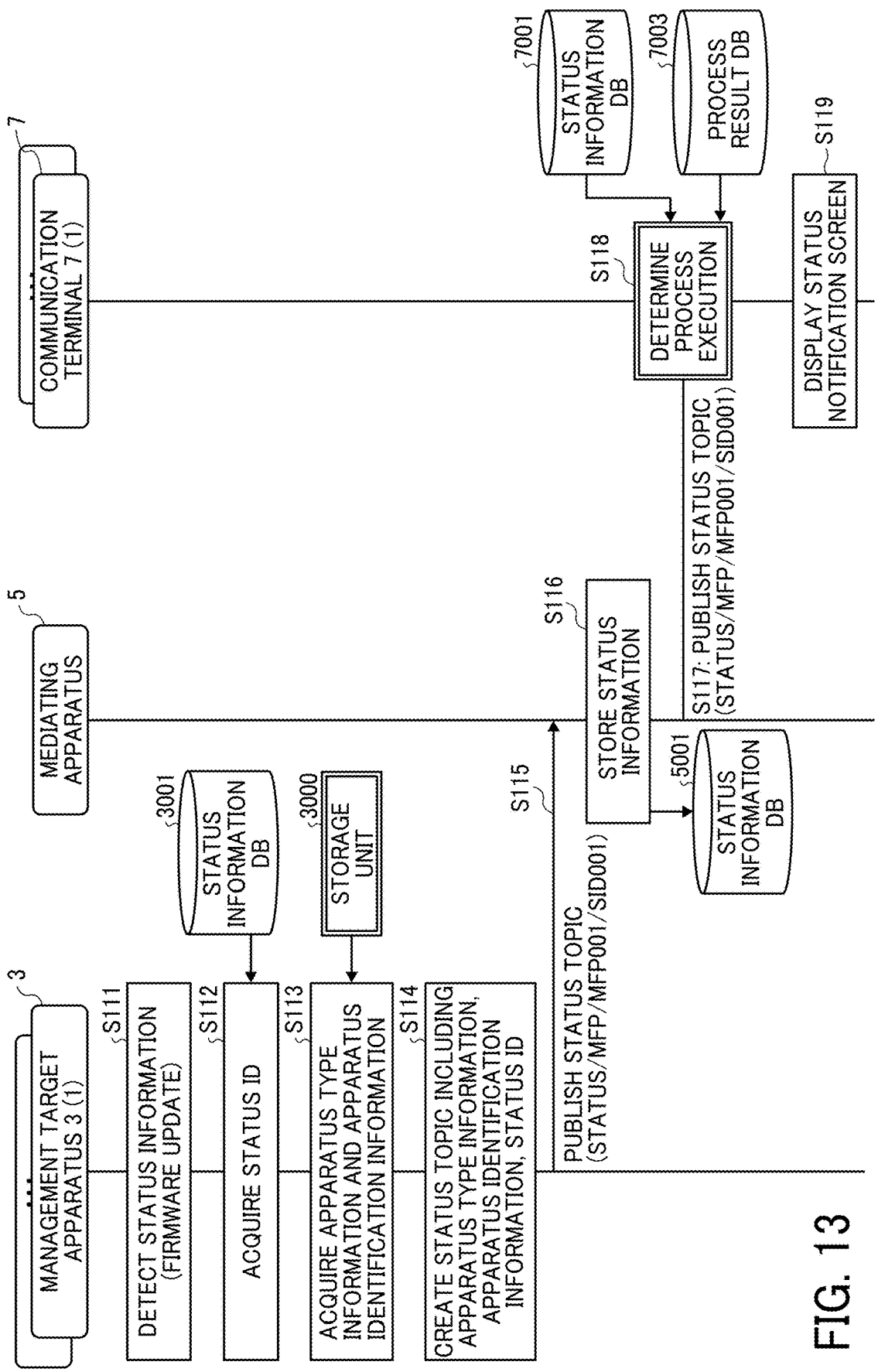
FIG. 13 is a sequence diagram illustrating an example of a status notification process up to screen display in the communication terminal.

FIG. 13 is a sequence diagram illustrating an example of a status notification process up to screen display in the communication terminal. As illustrated in FIG. 13, in step S111, the detection unit 32 of the management target apparatus 3 detects firmware update from the status of the program being executed in the own apparatus.

In step S112, the acquisition unit 33 searches the status information table stored in the status information DB 3001 and illustrated in FIG. 8A using the status indicated by the firmware update detected in step S111 as a search key and acquire the status ID "SID001".

In step S113, the acquisition unit 33 acquires the apparatus type information and the apparatus identification information stored in the storage unit 3000.

In step S114, the creation unit 34 creates a status topic. The status topic created here includes the apparatus type information, apparatus identification information, and status ID.

In step S115, the data exchange unit 31 publishes the created status topic to the mediating apparatus 5. Accordingly, the data exchange unit 51 of the mediating apparatus 5 receives the status topic published by the management target apparatus 3. At this time, the published status topic is, for example, "status/MFP/MFP001/SID001".

In step S116, the status management unit 56 of the mediating apparatus 5 that has received the status topic stores the status (for example, firmware update) corresponding to the status ID "SID001" included in the status topic in the status information table stored in the status information DB 5001 and illustrated in FIG. 9A. In the process of step S116, the status topic may not be stored in the status information table but may be published to the communication terminal 7 depending on the specification of the MQTT protocol.

In step S117, the data exchange unit 51 of the mediating apparatus 5 publishes the status topic received in step S115 to the communication terminal 7. Accordingly, the data exchange unit 71 of the communication terminal 7 receives the status topic published by the mediating apparatus 5. At this time, the published status topic is, for example, "status/MFP/MFP001/SID001". The information included in the status topic received in step S117 includes the apparatus status information indicating the status of the management target apparatus 3.

Figure 16:
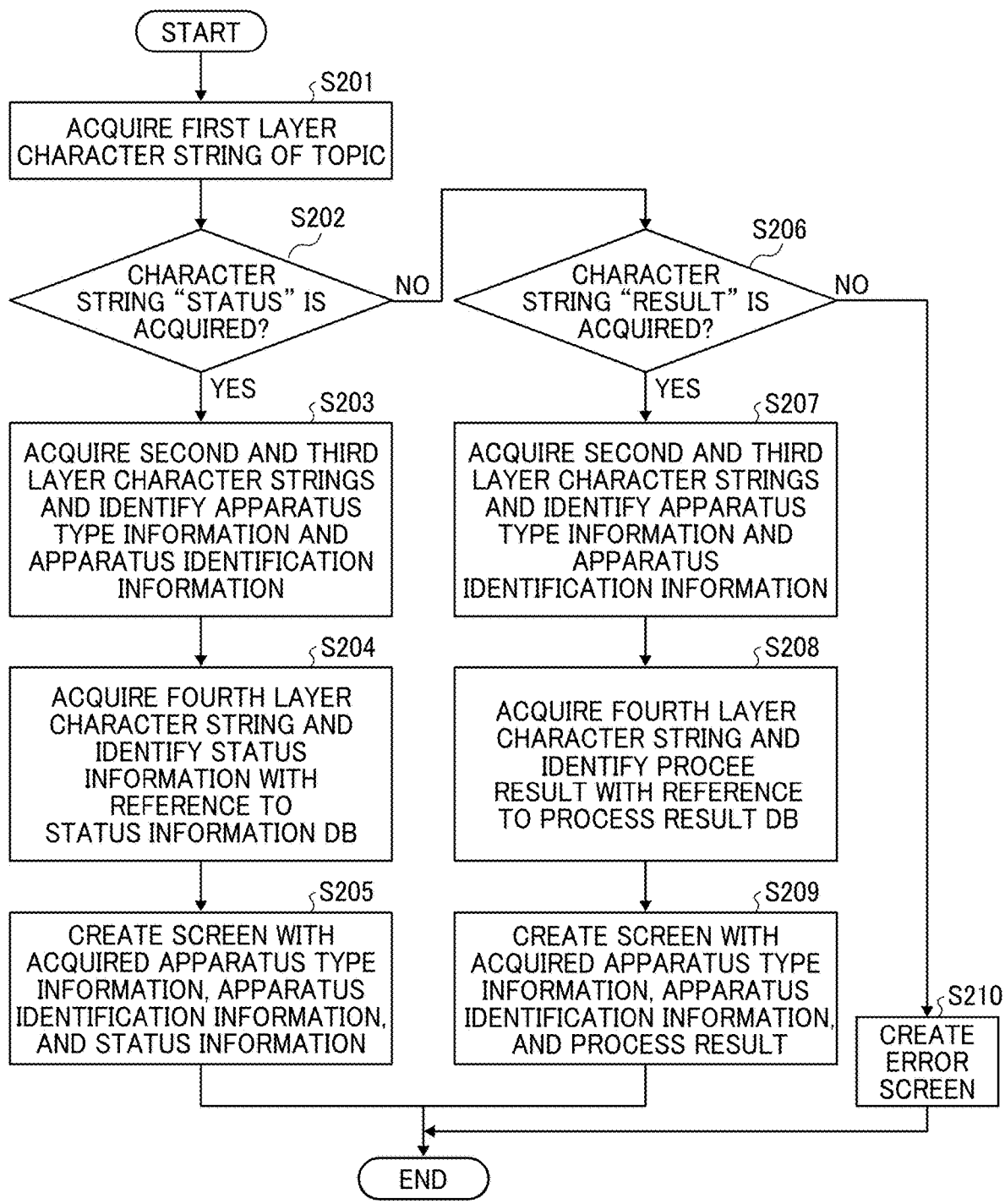
FIG. 16 is a flowchart illustrating an example of an execution determination process in the communication terminal.

In step S118, the determination unit 75 of the communication terminal 7 determines the execution of the process. FIG. 16 is a flowchart illustrating an example of an execution determination process in the communication terminal. In step S201, as illustrated in FIG. 16, the reception and acquisition unit 72 of the communication terminal acquires the character string of first layer included in the status topic received in step S116.

In step S202, the determination unit 75 determines whether the character string of the first layer acquired by the reception and acquisition unit 72 is "status". In step S203, when the acquired character string of the first layer is "status" (YES in step S202), the reception and acquisition unit 72 acquires the character strings of the second layer and the third layer and identifies the apparatus type information and the apparatus identification information.

In step S204, the reception and acquisition unit 72 acquires the character string of the fourth layer by searching the status information table stored in the status information DB 7001 and illustrated in FIG. 10A, using the character string acquired in cooperation with the status management unit 76 as a search key and identifies the status.

In step S205, the creation unit 73 creates a status notification screen based on the apparatus type information, apparatus identification information, and status identified in steps S203 and S204, and exits this flow.

On the other hand, when the character string of the first layer acquired by the reception and acquisition unit 72 is not "status" (NO in step S202), the determination unit 75 further determines whether the character string of the first layer acquired by the reception and acquisition unit 72 is "result" or not in step S206. When the character string of the first layer acquired by the reception and acquisition unit 72 is "result" (YES in step S206), the reception and acquisition unit 72 acquires the character strings of the second layer and the third layer and identifies the apparatus type information and the apparatus identification information in step S207.

In step S208, the reception and acquisition unit 72 acquires the character string of the fourth layer by searching the process result table stored in the process result DB 7003 and illustrated in FIG. 10C using the character string acquired in cooperation with the status management unit 76 as a search key and identifies corresponding process result.

In step S209, the creation unit 73 creates a status notification screen based on the apparatus type information, the apparatus identification information, and the result identified in steps S207 and S208 and exits this flow.

Further, when the character string of the first layer acquired by the reception and acquisition unit 72 is not "result" (NO in step S206), that is, when the character string of the first layer acquired by the reception and acquisition unit 72 is neither "status" nor "result", the creation unit 73 creates an error screen and exits this flow in step S210.

Figure 18A:
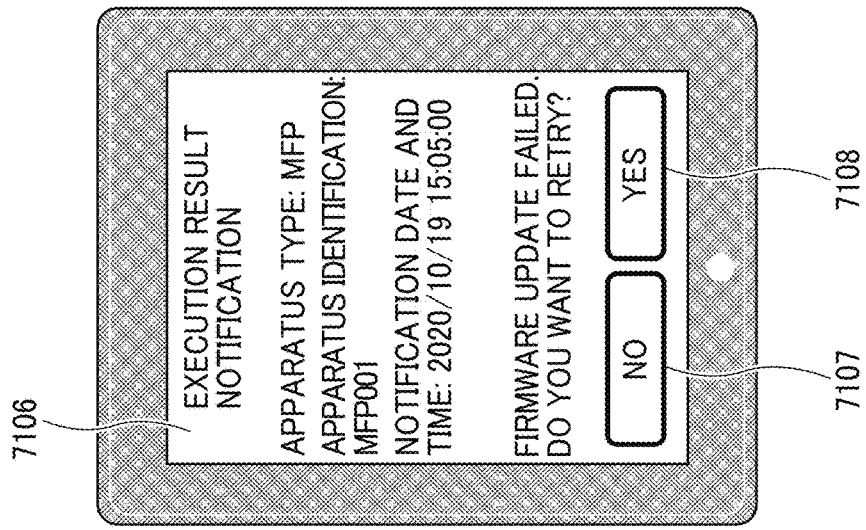
FIG. 18A is a diagram illustrating an example of a status notification screen displayed on the communication terminal.
Figure 18B:
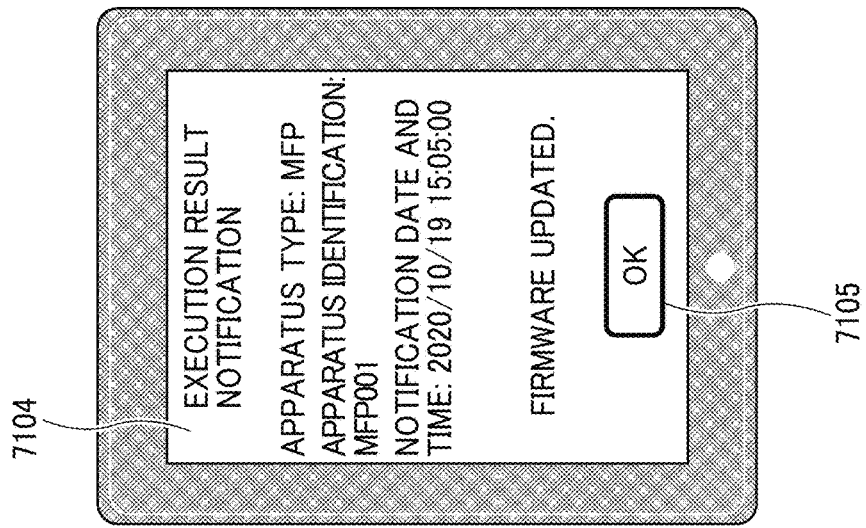
FIG. 18B is a diagram illustrating an example of an execution result notification screen displayed on the communication terminal.
Figure 18C:
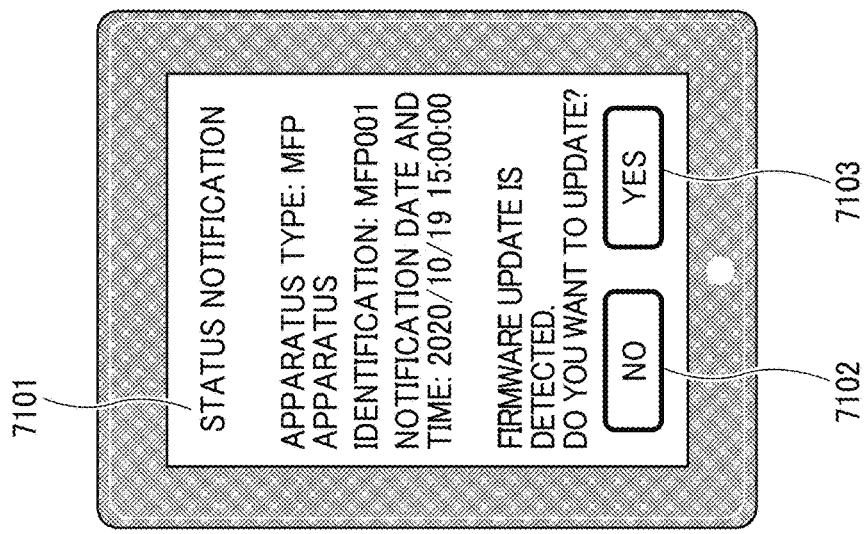
FIG. 18C is a diagram illustrating another example of the execution result notification screen displayed on the communication terminal.

Returning to FIG. 13, the display control unit 74 of the communication terminal 7 causes the display 706 of the communication terminal 7 to display a notification screen corresponding to each status. FIG. 18A is a diagram illustrating an example of the status notification screen displayed on the communication terminal 7. FIG. 18B is a diagram illustrating an example of an execution result notification screen displayed on the communication terminal 7. FIG. 18C is a diagram illustrating another example of the execution result notification screen displayed on the communication terminal 7. The status notification screen 7101 illustrated in FIG. 18A is an example of the screen displayed by the processes of steps S205 and S118 described above. On the status notification screen 7101, the display control unit 74 displays the apparatus type "MFP" and the apparatus identification information "MFP001" of the management target apparatus for notifying the status and notification date and time. On the status notification screen 7101, the display control unit 74 further displays a message stating "Firmware update is detected. Do you want to update?" and the "No" button 7102 and the "Yes" button 7103 for selecting whether to update the firmware.

In step S119, after determining the execution of the process in step S118, the display control unit 74 of the communication terminal 7 causes the display 706 to display the status notification screen 7101 such as the example illustrated in FIG. 18A.

Figure 14:
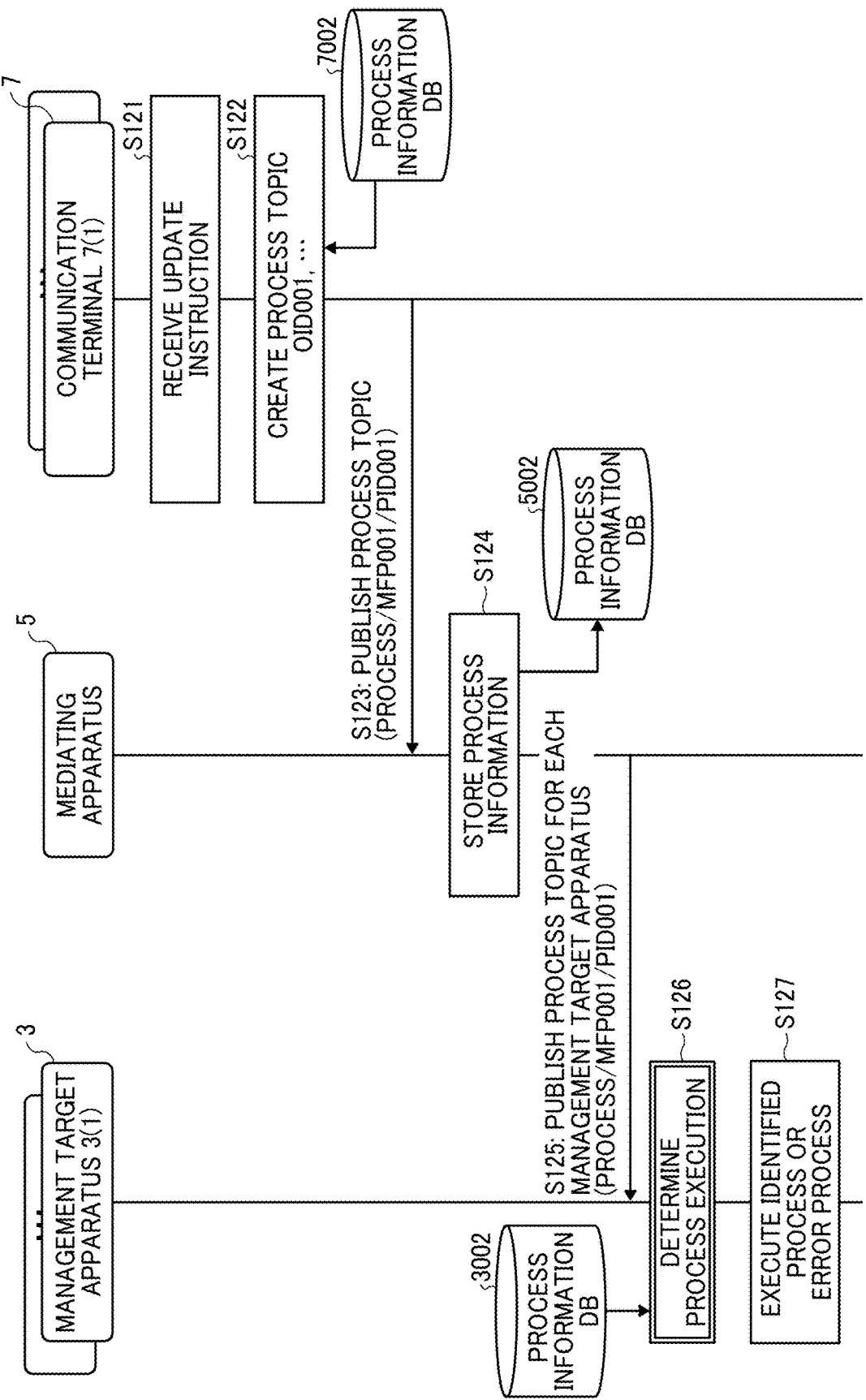
FIG. 14 is a sequence diagram illustrating an example up to execution of process in the management target apparatus.

FIG. 14 is a sequence diagram illustrating an example up to execution of process in the management target apparatus. First, the user operates the "Yes" button 7103 to update the firmware on the status notification screen 7101 of the communication terminal 7 illustrated in FIG. 18A. In step S121, the reception and acquisition unit 72 of the communication terminal 7 receives the firmware update instruction input by the user. In step S121 of the present embodiment, the firmware update instruction is received, but the instruction is not limited to the firmware update as long as the status is stored in the status information table stored in the status information DB 7001 and illustrated in FIG. 10C.

In step S122, the process management unit 77 searches the process information table stored in the process information DB 7002 and illustrated in FIG. 10B using the status corresponding to the status ID received in step S112 as a search key and in cooperation with the creation unit 73, a process topic related to the process (in this case, "firmware update" executed by the management target apparatus 3) that matches the status is created.

In step S123, the data exchange unit 71 publishes (transmits) the process topic created by the creation unit 73 to the mediating apparatus 5. Accordingly, the data exchange unit 51 of the mediating apparatus 5 receives the process topic published by the communication terminal 7. The published process topic is, for example, "process/MFP001/PID001".

In step S124, the process management unit 57 of the mediating apparatus 5 that has received the process topic stores the process (for example, firmware update) corresponding to the process ID "PID001" included in the process topic in the process information table stored in the process information DB 5002 and illustrated in FIG. 9B. In the process of step S124, the process topic may be published to the management target apparatus 3 without being stored in the process information table depending on the specification of the MQTT protocol.

In step S125, the data exchange unit 51 of the mediating apparatus 5 publishes (transmits) the process topic received in step S123 to each of the management target apparatuses 3 subscribed to the mediating apparatus 5 in steps S101 and S102. Accordingly, the data exchange unit 31 of the management target apparatus 3 receives the process topic published by the mediating apparatus 5. Here, the process such as firmware update included in the process topic received by the data exchange unit 31 is an example of process information indicating the predetermined process transmitted by the mediating apparatus 5 to the plurality of management target apparatuses 3.

Figure 17:
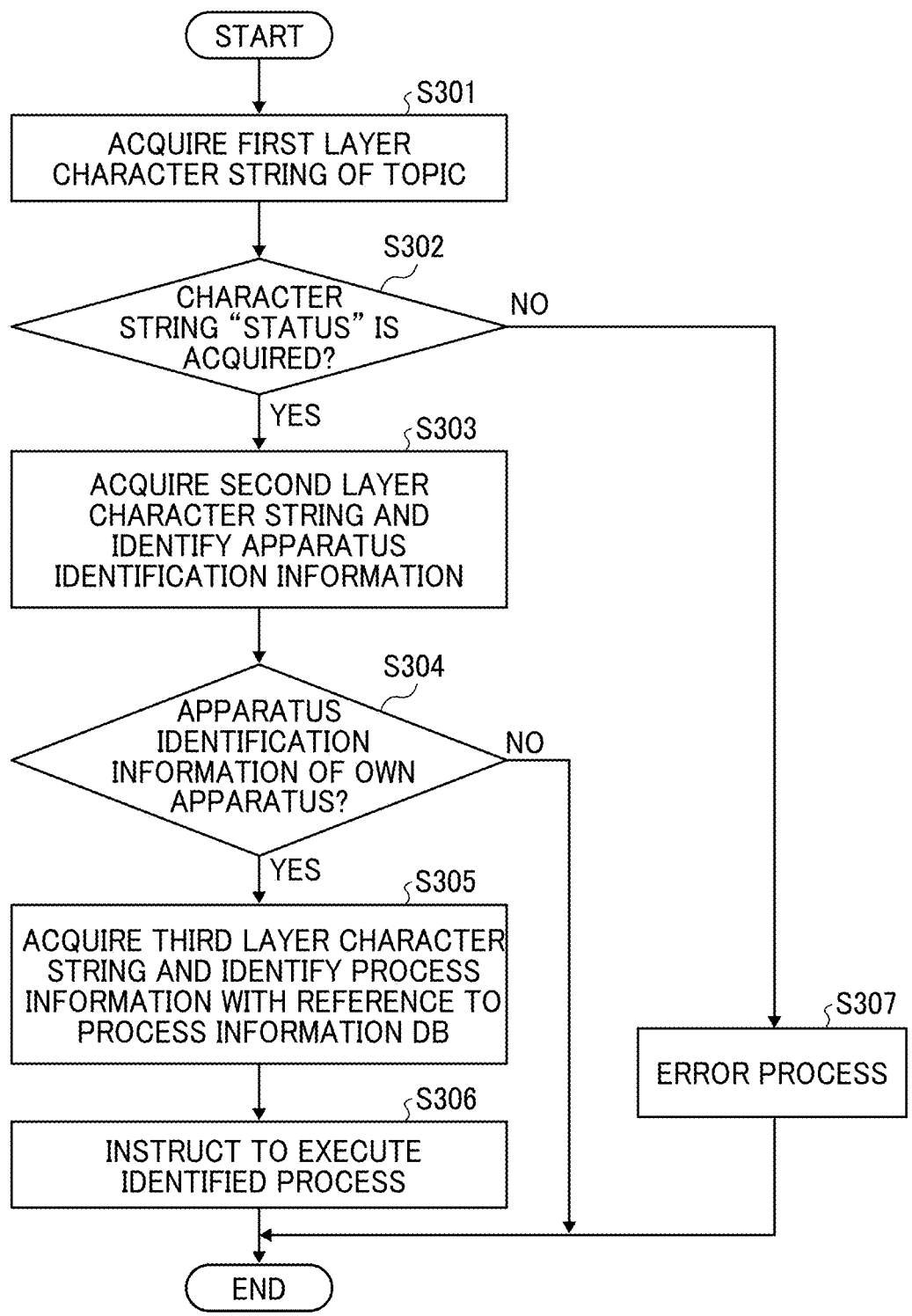
FIG. 17 is a flowchart illustrating an example of the execution determination process in the management target apparatus.

In step S126, the management target apparatus 3 that has received the process topic determines the execution of the process as described below. FIG. 17 is a flowchart illustrating an example of an execution determination process in the management target apparatus. In step S301 illustrated in FIG. 17, the acquisition unit 33 acquires the first layer character string included in the received process topic. In this case, the character string to be acquired is "process".

In step S302, the determination unit 35 determines whether the character string of the first layer acquired by the acquisition unit 33 is "process". When the acquired character string of the first layer is "process" (YES in step S302), the determination unit 35 acquires the character string of the second layer in cooperation with the acquisition unit 33 and identifies the apparatus identification information in step S303.

In step S304, the determination unit 35 determines whether the apparatus identification information included in the topic acquired by the acquisition unit 33 matches the apparatus identification information stored in the storage unit 3000 of the own management target apparatus 3. That is, the determination unit 35 determines whether the topic acquired as an example of the process information includes own apparatus identification information for identifying the own management target apparatus 3.

When the identified apparatus identification information matches the own apparatus identification information (YES in step S304), the determination unit 35 cooperates with the acquisition unit 33 to acquire the third layer character string, for example, "PID001". In step S305, the determination unit 35 searches the process information table stored in the process information DB 7002 and illustrated in FIG. 8B using the acquired three-layer character string "PID001" as a search key and identifies the corresponding process, for example, firmware update.

In step S306, the process management unit 37 instructs the execution unit 36 to execute the identified process and exits this flow.

In step S307, when the acquired character string of the first layer is not "process" (NO in step S302), the determination unit 35 executes the error process and exits this flow.

Returning to FIG. 14, the execution unit 36 executes the identified process or error process in step S127. In the present embodiment, for example, the firmware update of the management target apparatus 3 is executed as the identified process.

Figure 15:
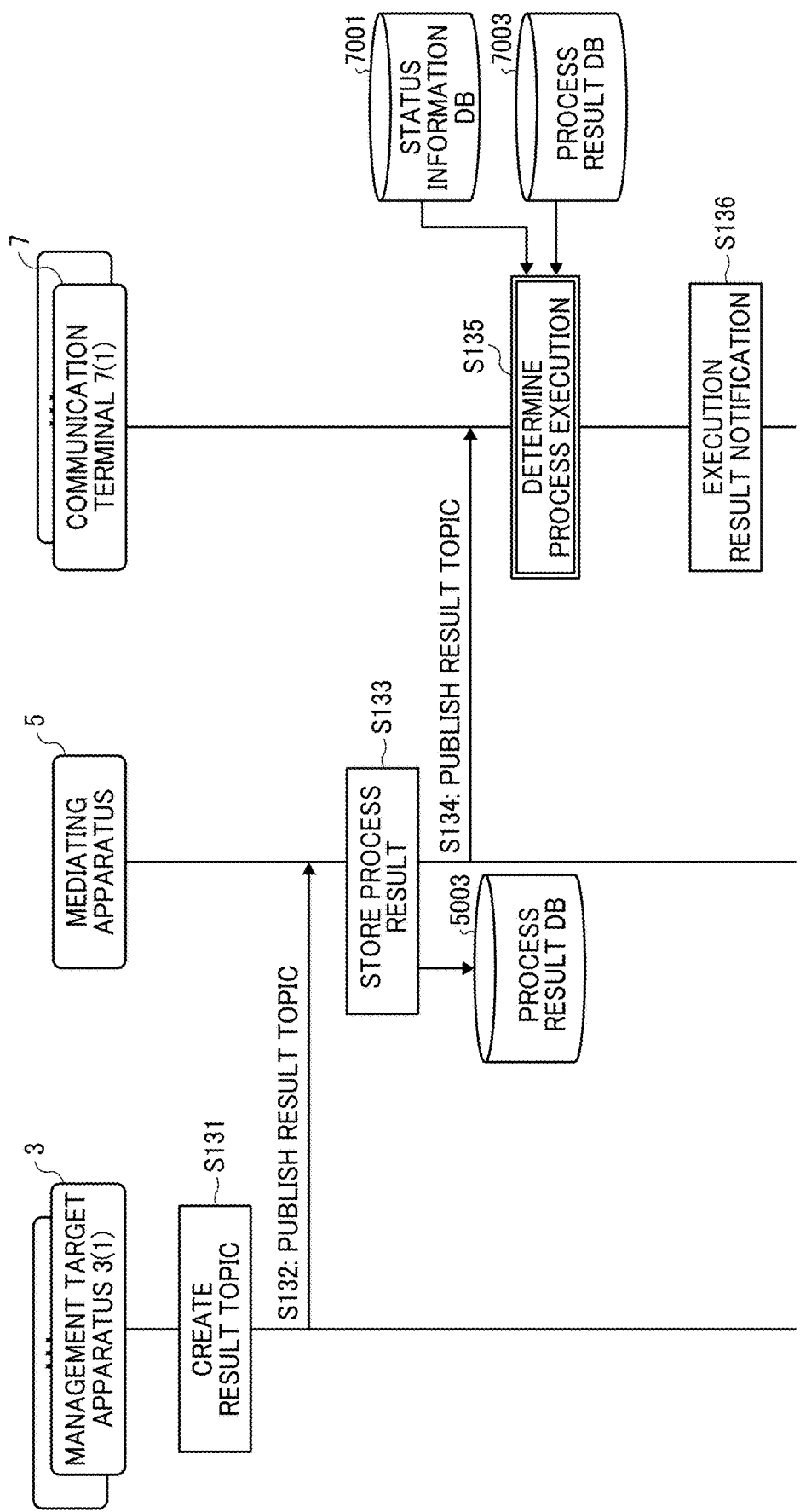
FIG. 15 is a sequence diagram illustrating an example up to displaying an execution result notification screen on the communication terminal.

FIG. 15 is a sequence diagram illustrating an example up to displaying the execution result notification screen on the communication terminal. In step S131, the creation unit 34 of the management target apparatus 3 executes the identified process and then creates a result topic as the process result.

In step S132, the data exchange unit 31 publishes (transmits) the created result topic to the mediating apparatus 5. Accordingly, the data exchange unit 51 of the mediating apparatus 5 receives the result topic published by the management target apparatus 3. An example of the published result topic is "result/MFP/MFP001/RID001".

In step S133, the status management unit 56 of the mediating apparatus 5 that has received the process topic stores the result (success) corresponding to the result ID "RID001" included in the result topic in the process result table stored in the process result DB 5003 and illustrated in FIG. 9C. In the process of step S133, the result topic may be published to the communication terminal 7 without storing in the process result table depending on the specification of the MQTT protocol.

In step S134, the data exchange unit 51 of the mediating apparatus 5 publishes the status topic received in step S132 to the communication terminal 7. Accordingly, the data exchange unit 71 of the communication terminal 7 receives the result topic published by the mediating apparatus 5. An example of the published result topic is "result/MFP/MFP001/RID001".

In step S135, the determination unit 75 of the communication terminal 7 determines the execution of the process. Since the execution determination of the process performed in step S135 corresponds to the process of steps S206 to S210 in FIG. 16 described above, the description is omitted here.

After determining the execution of the process in step S135, the display control unit 74 of the communication terminal 7 causes the display 706 to display the execution result notification screen indicating the execution result notification in step S136. As an example of the execution result notification screen, the display control unit 74 displays the execution result notification screen 7104 or 7106 illustrated in FIG. 18B or FIG. 18C as described above.

The execution result notification screen 7104 illustrated in FIG. 18B is an example of a screen displayed by the display control unit 74 in the process of steps S209 and S135 described above. On the execution result notification screen 7104, the display control unit 74 displays the apparatus type "MFP", the apparatus identification information "MFP001", and the notification date and time, as in the status notification screen 7101. On the execution result notification screen 7104, the display control unit 74 further displays a message stating "firmware update is completed" and an "OK" button 7105 to be pressed to confirm the message.

On the other hand, the execution result notification screen 7106 illustrated in FIG. 18C is an example of a screen displayed by the display control unit 74 in the process of steps S210 and S135 described above. On the execution result notification screen 7106, the display control unit 74 displays the apparatus type "MFP", the apparatus identification information "MFP001", and the notification date and time as in the execution result notification screen 7104. On the execution result notification screen 7106, the display control unit 74 further displays a selection button for selecting whether to re-execute (retry) the process executed by the management target apparatus 3, when the execution result notification includes an error notification. Specifically, the display control unit 74 displays a message stating "firmware update failed. Do you want to retry?" on the execution result notification screen 7106 and displays the "NO" button 7107 and the "YES" button 7108 for selecting whether to retry the firmware update. When the "YES" button 7108 is pressed by the user, the reception and acquisition unit 72 receives a retry instruction as a re-execution instruction of the firmware update operated by the user in step S121 and restarts the process after step S121.

As described above, according to the present embodiment, the data exchange unit 31 of the management target apparatus 3 in the apparatus management system 9 receives the process topic published by the mediating apparatus 5 in step S125, and when the received process topic includes the own apparatus identification information for identifying the own apparatus, the process indicated by the process information is identified in step S305, and the identified process is executed in steps S306 and S127. As a result, the management target apparatus 3 can identify a message for the own apparatus from the messages received from the communication terminal 7 and can execute the predetermined process according to the message.

In the above-described embodiment, each example including the status, the process, and the result is not limited to those described above, and various modifications are made within the scope of gist of the present disclosure described in the claims.

Further, in the communication system 1 according to the above-described embodiment, in executing each process of steps S101 and S102, another device or the like may be included between the management target apparatus 3 and the mediating apparatus 5. That is, the data exchange unit 51 of the mediating apparatus 5 may receive the information subscribed to by the data exchange unit 31 of the management target apparatus 3 through another device or the like. Similarly, in executing each of the processes of steps S103 and S104, another device or the like may be included between the communication terminal 7 and the mediating apparatus 5. That is, the data exchange unit 51 of the mediating apparatus 5 may receive the information subscribed (transmitted) by the data exchange unit 71 of the communication terminal 7 through another device or the like. Such a configuration can also be applied to the process in the other sequence diagrams described above.

Further, the various tables of the above-described embodiment may be generated by the learning effect of machine learning, and by classifying the data of each associated item by machine learning, the table may not be used. Here, the machine learning is a technology for making a computer acquire learning ability like a human being and the computer autonomously generates an algorithm required for determination such as data identification from learning data loaded in advance and applies the generated algorithm to new data to make a prediction. The learning method for machine learning may be any of supervised learning, unsupervised learning, semi-teacher learning, enhanced learning, and deep learning. Further, the learning method for machine learning uses these learning methods. The learning method may be a combination, and the learning method for machine learning does not matter.

In one aspect, a non-transitory recording medium is provided, which, when executed by one or more processors, cause the processors to perform a management method executed by a management target apparatus. The management method includes transmitting apparatus information of own apparatus, the apparatus information including apparatus status information indicating a status of each of the plurality of management target apparatuses, using a predetermined communication protocol to a communication terminal, receiving process information indicating a predetermined process for each of a plurality of management target apparatuses including the management target apparatus, created based on the apparatus status information transmitted from the communication terminal through a mediating apparatus that mediates between the plurality of management target apparatuses and the communication terminal, and executing the predetermined process indicated by the process information when the process information includes own apparatus identification information for identifying the own apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An apparatus management system comprising:
a plurality of management target apparatuses each configured to provide apparatus information of own apparatus; and
a communication terminal configured to receive apparatus status information included in the apparatus information received from each of the plurality of management target apparatuses, the apparatus status information indicating status of the management target apparatus, using a predetermined communication protocol,
wherein each of the plurality of the management target apparatuses including circuitry configured to:
transmit process request information for receiving process information, to a mediating apparatus that mediates between the plurality of management target apparatuses and the communication terminal;
receive the process information indicating a predetermined process for each of the plurality of management target apparatuses, created based on the apparatus status information transmitted from the communication terminal through the mediating apparatus; and
execute the predetermined process indicated by the process information when the process information includes own apparatus identification information for identifying the own apparatus and the process request information.

2. The apparatus management system of claim 1, wherein:
the circuitry of the each of the plurality of the management target apparatuses is further configured to determine whether the process information includes the own apparatus identification information.

3. The apparatus management system of claim 1, wherein the communication terminal comprises circuitry configured to:
receive process request information for receiving the process information transmitted by the mediating apparatus;
receive a selection for executing a process corresponding to the received process request information; and
receive a selection for re-executing the process.

4. The apparatus management system of claim 3, wherein:
the circuitry of the communication terminal is further configured to transmit the process information in response to receiving the selection for executing the process so as to enable a specific management target apparatus having the own apparatus identification information among the plurality of the management target apparatuses to receive the process information.

5. The apparatus management system of claim 1, wherein the communication terminal comprises:
circuitry configured to display on a display, the apparatus status information transmitted by the management target apparatus.

6. The apparatus management system of claim 5, wherein:
the circuitry of the communication terminal is further configured to display on the display an execution result notification indicating an execution result of the predetermined process executed by the management target apparatus.

7. The apparatus management system of claim 5, wherein:
the circuitry of the communication terminal is further configured to display on the display a re-execution selection button in response to receiving an execution result notification including content indicating an error.

8. The apparatus management system of claim 1, wherein:
the predetermined communication protocol includes Message Queueing Telemetry Transport (MQTT) protocol.

9. The apparatus management system of claim 1, wherein the communication terminal comprises circuitry configured to:
transmit second process request information including apparatus type information to the mediating apparatus;
receive target apparatus information from any one of plurality of management target apparatuses through the mediating apparatus; and
execute a predetermined second process when the target apparatus information includes the type information contained in the second process request information.

10. A management target apparatus comprising:
circuitry configured to:
transmit apparatus information of own apparatus, the apparatus information including apparatus status information indicating a status of the management target apparatus, using a predetermined communication protocol to a communication terminal;
transmit process request information for receiving process information, to a mediating apparatus that mediates between a plurality of management target apparatuses including the management target apparatus and the communication terminal;
receive the process information indicating a predetermined process for each of a plurality of management target apparatuses including the management target apparatus, created based on the apparatus status information transmitted from the communication terminal through the mediating apparatus; and
execute the predetermined process indicated by the process information when the process information includes own apparatus identification information for identifying the own apparatus and the process request information.

11. The management target apparatus of claim 10, wherein the circuitry is further configured to:
determine whether the process information includes the own apparatus identification information.

12. The management target apparatus of claim 10, wherein:
the predetermined communication protocol includes Message Queueing Telemetry Transport (MQTT) protocol.

13. A management method executed by a management target apparatus, the method comprising:
transmitting apparatus information of own apparatus, the apparatus information including apparatus status information indicating a status of the management target apparatus, using a predetermined communication protocol to a communication terminal;
transmitting process request information for receiving process information, to a mediating apparatus that mediates between a plurality of management target apparatuses including the management target apparatus and the communication terminal;
receiving the process information indicating a predetermined process for each of a plurality of management target apparatuses including the management target apparatus, created based on the apparatus status information transmitted from the communication terminal through the mediating apparatus; and
executing the predetermined process indicated by the process information when the process information includes own apparatus identification information for identifying the own apparatus and the process request information.

14. The method of claim 13, further comprising:
determining whether the process information includes the own apparatus identification information.

15. The method of claim 13, wherein:
the predetermined communication protocol includes Message Queueing Telemetry Transport (MQTT) protocol.

\* \* \* \* \*